US012652598B2

(12) United States Patent (10) Patent No.: US 12,652,598 B2
Gao et al. (45) Date of Patent: Jun. 9, 2026

(54) COMMUNICATION METHOD, APPARATUS, AND SYSTEM

(71) Applicant: HUAWEI TECHNOLOGIES CO., LTD., Shenzhen (CN)

(72) Inventors: Hui Gao, Dongguan (CN); Yichen Gao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 581 days.

(21) Appl. No.: 18/162,585

(22) Filed: Jan. 31, 2023

(65) Prior Publication Data

US 2023/0180093 A1    Jun. 8, 2023

Related U.S. Application Data

(63) Continuation    of    application    No. PCT/CN2020/106449, filed on Jul. 31, 2020.

(51) Int. Cl.
*H04W 36/32*    (2009.01)
*H04L 5/00*    (2006.01)
*H04W 36/00*    (2009.01)

(52) U.S. Cl.
CPC ........... *H04W 36/32* (2013.01); *H04L 5/0051* (2013.01); *H04W 36/0058* (2018.08)

(58) Field of Classification Search
None
See application file for complete search history.

(56) References Cited

U.S. PATENT DOCUMENTS

2015/0063140 A1*    3/2015  Yi .............................. H04L 5/14
                                                                  370/252
2019/0141592 A1*    5/2019  Park ...................... H04W 76/18
                    (Continued)

FOREIGN PATENT DOCUMENTS

CN          108633037 A    10/2018
CN          109561489 A    4/2019
                    (Continued)

OTHER PUBLICATIONS

Dahlman et al., "5G NR: The Next Generation Wireless Access Technology," Academic Press, Aug. 17, 2018, XP055775576, 400 pages.

(Continued)

*Primary Examiner* — Chirag G Shah
*Assistant Examiner* — Suk Jin Kang
(74) *Attorney, Agent, or Firm* — Fish & Richardson P.C.

(57)    ABSTRACT
A communication method, apparatus, and system are provided. The method may be performed by a first network device, or may be performed by a component (for example, a processor, a chip, or a chip system) of the first network device. In one example method, the first network device determines that a terminal device is to enter a first area, where the first area is an area in which the terminal device is handed over from the first network device to a second network device, or the first area is an area in which the first network device and the second network device perform joint transmission; and the first network device sends first indication information to the terminal device before the terminal device enters the first area, where the first indication information indicates to measure a first tracking reference signal of the second network device.

20 Claims, 14 Drawing Sheets

(56) References Cited

U.S. PATENT DOCUMENTS

| | | | | |
|---|---|---|---|---|
| 2019/0281587 | A1* | 9/2019 | Zhang | H04W 72/23 |
| 2020/0146107 | A1* | 5/2020 | Xiong | H04W 68/005 |
| 2020/0267712 | A1* | 8/2020 | Cirik | H04L 5/0023 |
| 2021/0058215 | A1* | 2/2021 | Si | H04L 5/001 |
| 2021/0076267 | A1* | 3/2021 | Cirkic | H04W 36/0058 |
| 2021/0135821 | A1* | 5/2021 | Guan | H04L 5/0048 |
| 2021/0227442 | A1* | 7/2021 | Yiu | H04W 36/00837 |
| 2021/0235338 | A1* | 7/2021 | Zhang | H04W 24/08 |
| 2021/0352499 | A1* | 11/2021 | Kim | H04W 24/04 |
| 2021/0360611 | A1* | 11/2021 | Manolakos | H04L 5/0053 |
| 2021/0385045 | A1* | 12/2021 | Frenne | H04L 5/0048 |
| 2022/0110138 | A1* | 4/2022 | Miao | H04L 5/0053 |
| 2022/0417775 | A1* | 12/2022 | Cirik | H04B 7/0695 |
| 2023/0068489 | A1* | 3/2023 | Abdelghaffar | H04L 5/0048 |
| 2023/0142795 | A1* | 5/2023 | Liu | H04W 24/08 370/252 |
| 2023/0189262 | A1* | 6/2023 | Zeineddine | H04L 5/0048 370/329 |
| 2024/0022305 | A1* | 1/2024 | Raghavan | H04B 7/063 |
| 2024/0137960 | A1* | 4/2024 | Park | H04L 5/0091 |
| 2024/0224278 | A1* | 7/2024 | Miao | H04L 1/08 |
| 2024/0259067 | A1* | 8/2024 | Kwak | H04L 5/0053 |
| 2025/0193895 | A1* | 6/2025 | Svedman | H04L 5/0053 |

FOREIGN PATENT DOCUMENTS

| | | |
|---|---|---|
| CN | 110447212 A | 11/2019 |
| CN | 110636567 A | 12/2019 |
| CN | 110662266 A | 1/2020 |
| CN | 110809279 A | 2/2020 |

OTHER PUBLICATIONS

Extended European Search Report in European Appln No. 20947216.6, dated Jun. 23, 2023, 14 pages.

International Search Report and Written Opinion in International Appln. No. PCT/CN2020/106449, mailed on Apr. 21, 2021, 15 pages (with English translation).

* cited by examiner

COMMUNICATION METHOD, APPARATUS, AND SYSTEM

CROSS-REFERENCE TO RELATED APPLICATIONS

This application is a continuation of International Application No. PCT/CN2020/106449, filed on Jul. 31, 2020, the disclosure of which is hereby incorporated by reference in its entirety.

TECHNICAL FIELD

This application relates to the field of wireless communication technologies, and in particular, to a communication method, apparatus, and system.

BACKGROUND

In a process of downlink communication between a terminal device and a network device, there is an air interface transmission delay between a time point at which the network device sends a downlink signal and a time point at which the terminal device receives the downlink signal, and there is a time offset between an air interface transmission delay estimated by the terminal device and an actual air interface transmission delay. This means that timing of the terminal device is asynchronous with that of the network device. In this way, demodulation performance of the downlink signal is reduced, and communication quality is reduced. In addition, when the terminal device is moving at a high speed, for example, in a high-speed railway communication scenario or a highway communication scenario, because a propagation distance difference between the network device and the terminal device changes, a downlink signal sent by the network device is affected by a Doppler effect in a transmission process. Consequently, a Doppler frequency offset (which may be referred to as a frequency offset for short) exists when the downlink signal arrives at the terminal device. In this way, demodulation performance of the downlink signal is also reduced, and communication quality is reduced. Currently, a terminal device may compensate, by measuring a tracking reference signal, for example, a tracking reference signal (TRS) or a synchronization signal and physical broadcast channel block (SSB), for a time offset caused by an air interface transmission delay and a frequency offset caused by a Doppler effect.

A process in which a terminal device compensates for a time offset and a frequency offset by measuring a tracking reference signal is as follows: After the terminal device performs cell handover, a target network device configures, for the terminal device, a time-frequency resource that carries the tracking reference signal. The target network device broadcasts the tracking reference signal, and sends media access control-control element (MAC-CE) signaling to the terminal device. The terminal device receives the tracking reference signal and the MAC-CE signaling, where the MAC-CE signaling indicates to measure the tracking reference signal. The terminal device measures the tracking reference signal to obtain a measurement result. The target network device sends downlink control information (DCI) signaling and a downlink signal to the terminal device, and the terminal device receives the DCI signaling and the downlink signal, where the DCI signaling indicates to demodulate the downlink signal based on the measurement result. The terminal device demodulates the downlink signal based on the measurement result.

When the terminal device is moving at a high speed, the terminal device performs cell handover quickly and frequently, and needs to track a time offset and a frequency offset in time to ensure communication quality. However, in an initial phase after the terminal device completes the cell handover, the terminal device needs to wait at least for receiving the MAC-CE signaling from the target network device, to start to measure the tracking reference signal. Within waiting duration, if the terminal device receives the downlink signal from the target network device, the terminal device directly demodulates the downlink signal. However, in this case, the terminal device has not measured the tracking reference signal, that is, the terminal device has not compensated for a time offset caused by an air interface transmission delay and a frequency offset caused by a Doppler effect. Consequently, performance of demodulating the downlink signal by the terminal device is affected, and communication quality is reduced.

SUMMARY

Embodiments of this application provide a communication method, apparatus, and system, to compensate for a time offset and a frequency offset in time, so as to improve communication quality.

According to a first aspect, an embodiment of this application provides a communication method. The method may be performed by a first network device, or may be performed by a component (for example, a processor, a chip, or a chip system) of the first network device. In the method, the first network device determines that a terminal device is to enter a first area, where the first area is an area in which the terminal device is handed over from the first network device to a second network device, or the first area is an area in which the first network device and the second network device perform joint transmission; and the first network device sends first indication information to the terminal device before the terminal device enters the first area, where the first indication information indicates to measure a first tracking reference signal of the second network device.

In the foregoing technical solution, the first network device determines that the terminal device is to perform cell handover or joint transmission. Before the terminal device performs cell handover or joint transmission, the first network device sends the first indication information to the terminal device, so as to trigger the terminal device to start to measure the first tracking reference signal before performing cell handover or joint transmission. This means that the terminal device may directly demodulate a downlink signal from the second network device based on a measurement result of the first tracking reference signal in an initial phase after the cell handover is completed or in an initial phase of the joint transmission. The terminal device does not need to wait for MAC-CE signaling of the second network device, so that time overheads of obtaining the measurement result by the terminal device can be reduced, and a problem of reduced demodulation performance of the downlink signal caused by a case in which the terminal device cannot compensate for a time offset and a frequency offset in time based on the result of the first tracking reference signal because the terminal device receives the downlink signal from the second network device but has not received the MAC-CE signaling of the second network device (or has not completed the measurement on the first tracking reference signal) in the initial phase after the cell handover is completed or the initial phase of the joint transmission is avoided. Therefore, communication quality is improved.

In a possible design, that the first network device determines that a terminal device is to enter a first area includes: The first network device receives information about first reference signal received quality from the terminal device; and when a difference between the first reference signal received quality and reference signal received quality of the terminal device in one or more neighboring cells is less than or equal to a first threshold, the first network device determines that the terminal device is to enter the first area.

In the foregoing design, the first network device may compare the reference signal received quality of the terminal device in a current cell with the reference signal received quality of the terminal device in the one or more neighboring cells, to determine whether the terminal device is to enter the first area. For example, if the difference between the reference signal received quality in the current cell and the reference signal received quality of the terminal device in the one or more neighboring cells is less than or equal to the first threshold, the first network device may determine that the terminal device is to enter the first area. Alternatively, if the reference signal received quality in the current cell is less than or equal to the reference signal received quality of the terminal device in the one or more neighboring cells, the first network device may determine that the terminal device is to enter the first area.

In a possible design, that the first network device determines that a terminal device is to enter a first area includes: The first network device determines, based on a movement direction of the terminal device and topology information of a network in which the first network device is located, that the terminal device is to enter the first area.

In the foregoing design, the first network device may determine, based on the movement direction of the terminal device and the topology information of the network in which the first network device is located, whether the terminal device is to enter the first area. The topology information of the network in which the first network device is located may include but is not limited to an identifier of at least one neighboring cell, an identifier of at least one network device adjacent to the first network device, location information (for example, longitude information and/or latitude information) of the at least one network device adjacent to the first network device, a location relationship between the at least one network device and the first network device (for example, located in the due north of the first network device, or located in the due south of the first network device), or a relative location of the at least one network device (for example, a location relative to the first network device). Therefore, the first network device can accurately determine, with reference to the movement direction of the terminal device and the network topology information, information such as a next access network device of the terminal device or a distance between the terminal device and the next access network device, so that the first network device can accurately determine whether the terminal device is to enter the first area.

In a possible design, the method further includes: The first network device receives first information from the terminal device, where the first information indicates a first quantity and a second quantity, the first quantity is a quantity of simultaneously activated transmission configuration indicator-states supported by the terminal device, the second quantity is a quantity of simultaneously measured tracking reference signals supported by the terminal device, and the transmission configuration indicator-state indicates a correspondence between a tracking reference signal and a service; and when the first quantity is greater than or equal to 2 and the second quantity is greater than or equal to 2, the first network device determines that the terminal device has a capability of compensating for a time offset and a frequency offset based on the measurement result of the first tracking reference signal and a measurement result of a second tracking reference signal, where the second tracking reference signal is a tracking reference signal of the first network device.

In the foregoing design, the first network device may determine, by using the first information reported by the terminal device, whether the terminal device has the capability of compensating for the time offset and the frequency offset based on the measurement result of the first tracking reference signal and the measurement result of the second tracking reference signal. For example, when determining that the terminal device has the capability of compensating for the time offset and the frequency offset based on the measurement result of the first tracking reference signal and the measurement result of the second tracking reference signal, the first network device may send the first indication information to the terminal device before the terminal device enters the first area. Because the terminal device has the capability of compensating for the time offset and the frequency offset based on the measurement result of the first tracking reference signal and the measurement result of the second tracking reference signal, after receiving the first indication information, the terminal device can measure the first tracking reference signal to obtain the measurement result, and after entering the first area, the terminal device can compensate for the time offset and the frequency offset based on the measurement result of the first tracking reference signal, so that communication quality between the terminal device and the second network device in the initial phase after the cell handover is completed (or the initial phase of the joint transmission) can be improved.

In a possible design, the method further includes: The first network device receives third indication information from the terminal device, where the third indication information indicates that the terminal device has a capability of compensating for a time offset and a frequency offset based on the measurement result of the first tracking reference signal and a measurement result of a second tracking reference signal, and the second tracking reference signal is a tracking reference signal of the first network device.

In the foregoing design, the terminal device may directly indicate, to the first network device, that the terminal device has the capability of compensating for the time offset and the frequency offset based on the measurement result of the first tracking reference signal and the measurement result of the second tracking reference signal. In this way, before the terminal device enters the first area, the first network device may send the first indication information to the terminal device. Because the terminal device has the capability of compensating for the time offset and the frequency offset based on the measurement result of the first tracking reference signal and the measurement result of the second tracking reference signal, after receiving the first indication information, the terminal device can measure the first tracking reference signal to obtain the measurement result, and after entering the first area, the terminal device can compensate for the time offset and the frequency offset based on the measurement result of the first tracking reference signal, so that communication quality between the terminal device and the second network device in the initial phase after the cell handover is completed (or the initial phase of the joint transmission) can be improved.

In a possible design, compensating for the time offset and the frequency offset based on the measurement result of the first tracking reference signal and the measurement result of the second tracking reference signal includes: increasing filtering coefficients of a crystal oscillator for the time offset and the frequency offset based on the first tracking reference signal.

In the foregoing design, the terminal device may increase the filtering coefficients of the crystal oscillator for the time offset and the frequency offset. In this way, after receiving DCI signaling from the second network device, the terminal device can immediately compensate for the time offset and the frequency offset based on the measurement result of the first tracking reference signal, so that the terminal device can compensate for the time offset and the frequency offset in time. Therefore, a problem that demodulation performance is reduced because the time offset and the frequency offset cannot be compensated in time is avoided.

In a possible design, the first indication information includes at least one of an identifier of the first tracking reference signal or information about a time-frequency resource that carries the first tracking reference signal.

In the foregoing design, the first indication information sent by the first network device to the terminal device may include at least one of the identifier of the first tracking reference signal or the information about the time-frequency resource that carries the first tracking reference signal. In this way, the terminal device may complete receiving of the first tracking reference signal of the second network device based on the identifier of the first tracking reference signal (or the time-frequency resource that carries the first tracking reference signal), so that the terminal device can start to measure the first tracking reference signal before entering the first area.

In a possible design, before the terminal device enters the first area, the method further includes: The first network device receives a first message from the second network device, where the first message includes the first indication information.

In the foregoing design, before the terminal device enters the first area, the second network device may send the first message to the first network device. Correspondingly, the first network device receives the first message, so that the first network device can determine the identifier of the first tracking reference signal of the second network device and/or the information about the time-frequency resource that carries the first tracking reference signal. Further, when determining that the terminal device is to enter the first area, the first network device may send the identifier of the first tracking reference signal and/or the information about the time-frequency resource that carries the first tracking reference signal to the terminal device, so that the terminal device completes receiving of the first tracking reference signal.

In a possible design, before receiving the first message from the second network device, the method further includes: The first network device sends a second message to the second network device, where the second message requests the first indication information.

In the foregoing design, before the terminal device enters the first area, the first network device may send the second message to the second network device. Correspondingly, the second network device receives the second message, so that after receiving the second message, the second network device sends the identifier of the first tracking reference signal and/or the information about the time-frequency resource that carries the first tracking reference signal to the first network device.

According to a second aspect, an embodiment of this application provides a communication method. The method may be performed by a terminal device, or may be performed by a component (for example, a processor, a chip, or a chip system) of the terminal device. In the method, the terminal device receives first indication information from a first network device before the terminal device enters a first area, where the first indication information indicates to measure a first tracking reference signal of a second network device; and the first area is an area in which the terminal device is handed over from the first network device to the second network device, or the first area is an area in which the first network device and the second network device perform joint transmission; the terminal device measures the first tracking reference signal to obtain a first measurement result; after the terminal device enters the first area, the terminal device receives a first downlink signal from the second network device; and the terminal device demodulates the first downlink signal based on the first measurement result.

In a possible design, after the terminal device enters the first area, the method further includes: The terminal device receives second indication information from the second network device, where the second indication information indicates to demodulate the first downlink signal based on the first measurement result.

In a possible design, the method further includes: The terminal device sends information about first reference signal received quality to the first network device, where the information about the first reference signal received quality is used to determine that the terminal device is to enter the first area.

In a possible design, the method further includes: The terminal device sends first information to the first network device, where the first information indicates a first quantity and a second quantity, the first information is used to determine that the terminal device has a capability of compensating for a time offset and a frequency offset based on the first measurement result and a measurement result of a second tracking reference signal, the first quantity is a quantity of simultaneously activated transmission configuration indicator-states supported by the terminal device, the second quantity is a quantity of simultaneously measured tracking reference signals supported by the terminal device, the transmission configuration indicator-state indicates a correspondence between a tracking reference signal and a service, and the second tracking reference signal is a tracking reference signal of the first network device.

In a possible design, the method further includes: The terminal device sends third indication information to the first network device, where the third indication information indicates that the terminal device has a capability of compensating for a time offset and a frequency offset based on the first measurement result and a measurement result of a second tracking reference signal, and the second tracking reference signal is a tracking reference signal of the first network device.

In a possible design, compensating for the time offset and the frequency offset based on the first measurement result and the measurement result of the second tracking reference signal includes: increasing filtering coefficients of a crystal oscillator for the time offset and the frequency offset based on the first measurement result.

According to a third aspect, an embodiment of this application provides a communication method. The method may be performed by a second network device, or may be performed by a component (for example, a processor, a chip, or a chip system) of the second network device. In the method, the second network device sends a first message to a first network device before a terminal device enters a first area, where the first message includes first indication information; the first indication information includes at least one of an identifier of a first tracking reference signal or information about a time-frequency resource that carries the first tracking reference signal; the first area is an area in which the terminal device is handed over from the first network device to the second network device, or the first area is an area in which the first network device and the second network device perform joint transmission; and the first indication information is used by the terminal device to measure the first tracking reference signal to obtain a first measurement result; and after the terminal device enters the first area, the second network device sends second indication information and a first downlink signal to the terminal device, where the second indication information indicates to demodulate the first downlink signal based on the first measurement result.

In a possible design, before that the second network device sends a first message to a first network device, the method further includes: The second network device receives a second message from the first network device, where the second message requests the first indication information.

According to a fourth aspect, an embodiment of this application provides a communication apparatus. The communication apparatus may be a first network device, or may be an apparatus in the first network device. The communication apparatus may include a processing module and a transceiver module. The modules may perform corresponding functions performed by the first network device in any design example of the first aspect.

The processing module is configured to determine that a terminal device is to enter a first area, where the first area is an area in which the terminal device is handed over from the first network device to a second network device, or the first area is an area in which the first network device and the second network device perform joint transmission.

The transceiver module is configured to: send first indication information to the terminal device before the terminal device enters the first area, where the first indication information indicates to measure a first tracking reference signal of the second network device.

In a possible design, the transceiver module is specifically configured to receive information about first reference signal received quality from the terminal device; and the processing module is specifically configured to: when a difference between the first reference signal received quality and reference signal received quality of the terminal device in one or more neighboring cells is less than or equal to a first threshold, determine that the terminal device is to enter the first area.

In a possible design, the processing module is specifically configured to: determine, based on a movement direction of the terminal device and topology information of a network in which the first network device is located, that the terminal device is to enter the first area.

In a possible design, the transceiver module is further configured to receive first information from the terminal device, where the first information indicates a first quantity and a second quantity, the first quantity is a quantity of simultaneously activated transmission configuration indicator-states supported by the terminal device, the second quantity is a quantity of simultaneously measured tracking reference signals supported by the terminal device, and the transmission configuration indicator-state indicates a correspondence between a tracking reference signal and a service; and the processing module is further configured to: when the first quantity is greater than or equal to 2 and the second quantity is greater than or equal to 2, determine that the terminal device has a capability of compensating for a time offset and a frequency offset based on a measurement result of the first tracking reference signal and a measurement result of a second tracking reference signal, where the second tracking reference signal is a tracking reference signal of the first network device.

In a possible design, the transceiver module is further configured to receive third indication information from the terminal device, where the third indication information indicates that the terminal device has a capability of compensating for a time offset and a frequency offset based on a measurement result of the first tracking reference signal and a measurement result of a second tracking reference signal, and the second tracking reference signal is a tracking reference signal of the first network device.

In a possible design, compensating for the time offset and the frequency offset based on the measurement result of the first tracking reference signal and the measurement result of the second tracking reference signal includes: increasing filtering coefficients of a crystal oscillator for the time offset and the frequency offset based on the first tracking reference signal.

In a possible design, the first indication information includes at least one of an identifier of the first tracking reference signal or information about a time-frequency resource that carries the first tracking reference signal.

In a possible design, before the terminal device enters the first area, the transceiver module is further configured to receive a first message from the second network device, where the first message includes the first indication information.

In a possible design, before receiving the first message from the second network device, the transceiver module is further configured to send a second message to the second network device, where the second message requests the first indication information.

According to a fifth aspect, an embodiment of this application provides a communication apparatus. The communication apparatus may be a terminal device, or may be an apparatus in the terminal device. The communication apparatus may include a processing module and a transceiver module. The modules may perform corresponding functions performed by the terminal device in any design example of the second aspect.

The transceiver module is configured to receive first indication information from a first network device before the terminal device enters a first area, where the first indication information indicates to measure a first tracking reference signal of a second network device; and the first area is an area in which the terminal device is handed over from the first network device to the second network device, or the first area is an area in which the first network device and the second network device perform joint transmission.

The processing module is configured to measure the first tracking reference signal to obtain a first measurement result.

The transceiver module is further configured to: after the terminal device enters the first area, receive a first downlink signal from the second network device.

The processing module is further configured to demodulate the first downlink signal based on the first measurement result.

In a possible design, after the terminal device enters the first area, the transceiver module is further configured to receive second indication information from the second network device, where the second indication information indicates to demodulate the first downlink signal based on the first measurement result.

In a possible design, the transceiver module is further configured to send information about first reference signal received quality to the first network device, where the information about the first reference signal received quality is used to determine that the terminal device is to enter the first area.

In a possible design, the transceiver module is further configured to send first information to the first network device, where the first information indicates a first quantity and a second quantity, the first information is used to determine that the terminal device has a capability of compensating for a time offset and a frequency offset based on the first measurement result and a measurement result of a second tracking reference signal, the first quantity is a quantity of simultaneously activated transmission configuration indicator-states supported by the terminal device, the second quantity is a quantity of simultaneously measured tracking reference signals supported by the terminal device, the transmission configuration indicator-state indicates a correspondence between a tracking reference signal and a service, and the second tracking reference signal is a tracking reference signal of the first network device.

In a possible design, the transceiver module is further configured to send third indication information to the first network device, where the third indication information indicates that the terminal device has a capability of compensating for a time offset and a frequency offset based on the first measurement result and a measurement result of a second tracking reference signal, and the second tracking reference signal is a tracking reference signal of the first network device.

In a possible design, compensating for the time offset and the frequency offset based on the first measurement result and the measurement result of the second tracking reference signal includes: increasing filtering coefficients of a crystal oscillator for the time offset and the frequency offset based on the first measurement result.

According to a sixth aspect, an embodiment of this application provides a communication apparatus. The communication apparatus may be a second network device, or may be an apparatus in the second network device. The communication apparatus may include a processing module and a transceiver module. The modules may perform corresponding functions performed by the second network device in any design example of the third aspect.

The transceiver module is configured to send a first message to a first network device before a terminal device enters a first area, where the first message includes first indication information; the first indication information includes at least one of an identifier of a first tracking reference signal or information about a time-frequency resource that carries the first tracking reference signal; the first area is an area in which the terminal device is handed over from the first network device to the second network device, or the first area is an area in which the first network device and the second network device perform joint transmission; and the first indication information is used by the terminal device to measure the first tracking reference signal to obtain a first measurement result; and send second indication information and a first downlink signal to the terminal device, where the second indication information indicates to demodulate the first downlink signal based on the first measurement result.

In a possible design, before the second network device sends the first message to the first network device, the transceiver module is further configured to:

receive a second message from the first network device, where the second message requests the first indication information.

According to a seventh aspect, an embodiment of this application provides a communication apparatus. The communication apparatus includes a processor, configured to implement the method performed by the first network device in the first aspect. The communication apparatus may further include a memory, configured to store program instructions and data. The memory is coupled to the processor. The processor may invoke and execute the program instructions stored in the memory, to implement any method performed by the first network device in the first aspect. The communication apparatus may further include a transceiver. The transceiver is used by the communication apparatus to communicate with another device. For example, the another device is a terminal device or a second network device.

According to an eighth aspect, an embodiment of this application provides a communication apparatus. The communication apparatus includes a processor, configured to implement the method performed by the terminal device in the third aspect. The communication apparatus may further include a memory, configured to store program instructions and data. The memory is coupled to the processor. The processor may invoke and execute the program instructions stored in the memory, to implement any method performed by the terminal device in the third aspect. The communication apparatus may further include a transceiver. The transceiver is used by the communication apparatus to communicate with another device. For example, the another device is a first network device or a second network device.

According to a ninth aspect, an embodiment of this application provides a communication apparatus. The communication apparatus includes a processor, configured to implement the method performed by the second network device in the third aspect. The communication apparatus may further include a memory, configured to store program instructions and data. The memory is coupled to the processor. The processor may invoke and execute the program instructions stored in the memory, to implement any method performed by the second network device in the third aspect. The communication apparatus may further include a transceiver. The transceiver is used by the communication apparatus to communicate with another device. For example, the another device is a terminal device or a first network device.

According to a tenth aspect, an embodiment of this application further provides a computer-readable storage medium. The storage medium stores a computer program or instructions. When the computer program is executed or the instructions are executed, the method performed by the first network device in any design example of the first aspect or the method performed by the second network device in any design example of the third aspect may be implemented.

According to an eleventh aspect, an embodiment of this application further provides a computer-readable storage medium. The storage medium stores a computer program or instructions. When the computer program is executed or the instructions are executed, the method performed by the terminal device in any design example of the second aspect may be implemented.

According to a twelfth aspect, an embodiment of this application further provides a computer program product, including instructions. When the instructions are run on a computer, the computer is enabled to perform the method performed by the first network device in any design example of the first aspect or the method performed by the second network device in any design example of the third aspect.

According to a thirteenth aspect, an embodiment of this application further provides a computer program product, including instructions. When the instructions are run on a computer, the computer is enabled to perform the method performed by the terminal device in any design example of the second aspect.

According to a fourteenth aspect, an embodiment of this application provides a chip system. The chip system includes a processor, and may further include a memory, to implement the method performed by the first network device in any design example of the first aspect or the method performed by the second network device in any design example of the third aspect. The chip system may include a chip, or may include the chip and another discrete component.

According to a fifteenth aspect, an embodiment of this application provides a chip system. The chip system includes a processor, and may further include a memory, to implement the method performed by the terminal device in any design example of the second aspect. The chip system may include a chip, or may include the chip and another discrete component.

According to a sixteenth aspect, an embodiment of this application further provides a communication system. The communication system includes the communication apparatus in any design example of the fourth aspect, and/or the communication apparatus in any design example of the fifth aspect, and/or the communication apparatus in any design example of the sixth aspect.

For beneficial effects of the second aspect to the sixteenth aspect and the implementations thereof, refer to the descriptions of the beneficial effects of the first aspect and the implementations thereof.

DESCRIPTION OF EMBODIMENTS

Figure 1:
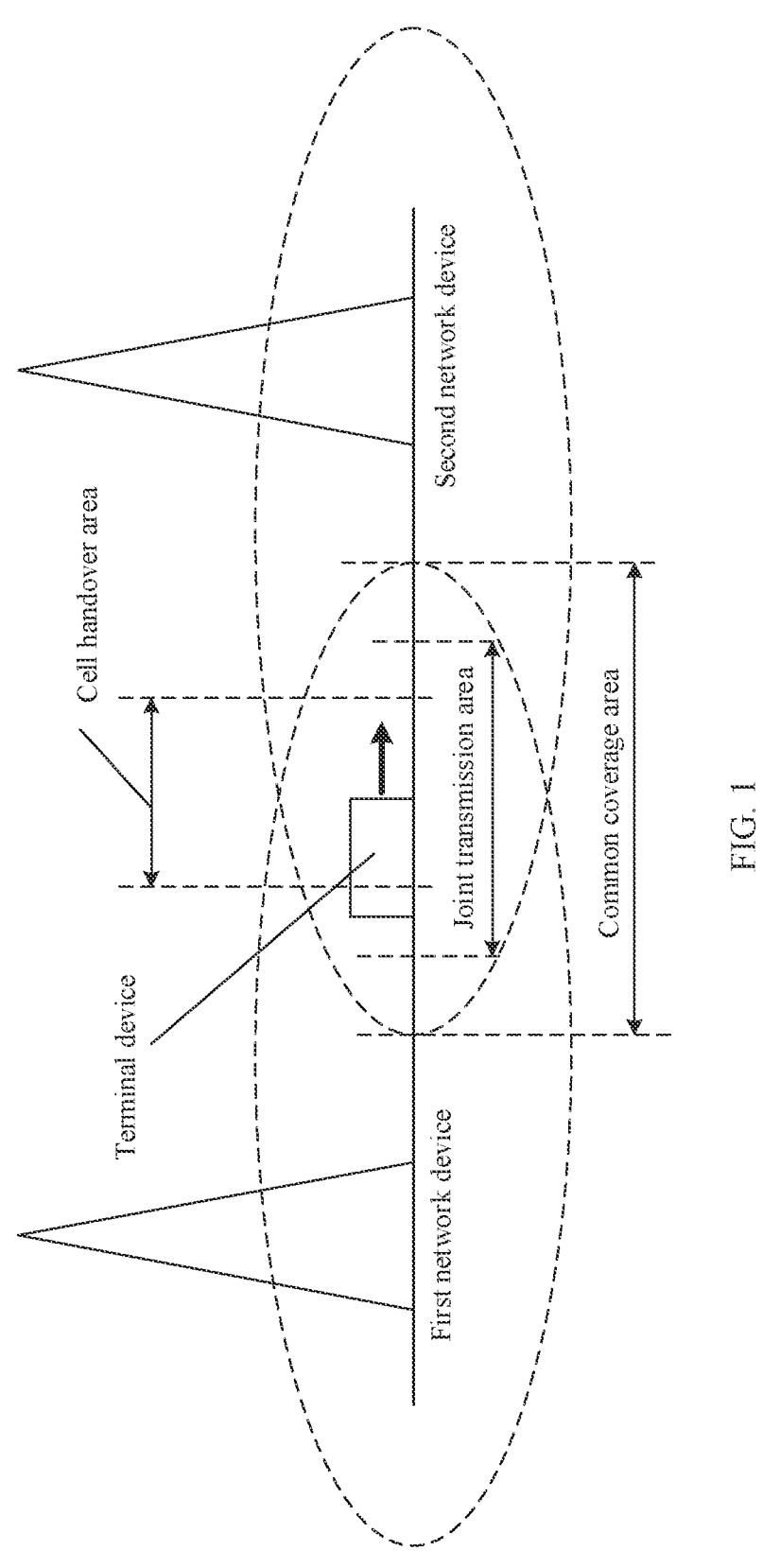
FIG. 1 is a schematic diagram in which a first network device and a second network device perform joint transmission according to an embodiment of this application.

For ease of understanding, the following first explains proprietary concepts and nouns in embodiments of this application.

(1) A network device may be an access network device. The access network device may also be referred to as a radio access network (RAN) device, and is a device that provides a wireless communication function for a terminal device. For example, the access network device includes but is not limited to a next generation NodeB (gNB) in 5th generation (5G), an evolved NodeB (eNB), a remote radio unit (RRU), a baseband unit (BBU), a transmission reception point (TRP), a transmission point (TP), a base station in a future mobile communication system, or an access point in a Wi-Fi system. Alternatively, the access network device may be a radio controller, a central unit (CU), and/or a distributed unit (DU) in a cloud radio access network (CRAN) scenario, or the network device may be a relay station, a vehicle-mounted device, a network device in a future evolved network, or the like.

In embodiments of this application, an apparatus configured to implement a function of the network device may be a network device, or may be an apparatus, for example, a chip system, that can support the network device in implementing the function. The apparatus may be mounted in the network device. In embodiments of this application, the technical solutions provided in embodiments of this application are described by using an example in which the apparatus configured to implement the function of the network device is the network device.

(2) A terminal device may be referred to as a terminal for short, for example, user equipment, and is a device having wireless sending and receiving functions. The terminal device may be deployed on land (for example, a vehicle-mounted device, a vehicle, a high-speed railway, or a motor vehicle), or may be deployed on a water surface (for example, a ship), or may be deployed in the air (for example, an airplane, an unmanned aerial vehicle, a balloon, or a satellite). The terminal device may be a mobile phone, a tablet computer, a computer having wireless sending and receiving functions, a virtual reality terminal device, an augmented reality terminal device, a wireless terminal device in industrial control, a wireless terminal device in self-driving, a wireless terminal device in telemedicine, a wireless terminal device in a smart grid, a wireless terminal device in transportation safety, a wireless terminal device in a smart city, or a wireless terminal device in a smart home. This is not limited in embodiments of this application.

The terminal device may communicate with a plurality of access network devices by using different technologies. For example, the terminal device may communicate with an access network device supporting long term evolution (LTE), may communicate with an access network device supporting 5G, or may communicate with both an access network device supporting LTE and an access network device supporting 5G. This is not limited in embodiments of this application.

In embodiments of this application, an apparatus configured to implement a function of the terminal may be a terminal device, or may be an apparatus, for example, a chip system, that can support the terminal device in implementing the function. The apparatus may be mounted in the terminal device. In embodiments of this application, the chip system may include a chip, or may include the chip and another discrete component. In embodiments of this application, the technical solutions provided in embodiments of this application are described by using an example in which the apparatus configured to implement the function of the terminal device is the terminal device.

(3) A combined cell may also be referred to as a logical cell. A plurality of network devices (for example, RRUs) may be deployed in one combined cell. Each of the plurality of network devices corresponds to one physical cell, and the plurality of physical cells may form one combined cell. For example, when a terminal device accesses the combined cell, a primary network device in the plurality of network devices may configure, to the terminal device by using radio resource control (RRC) signaling, a time-frequency resource that carries a tracking reference signal of each network device, so that time overheads of configuring, by the network device for the terminal device after the terminal device accesses a physical cell, the time-frequency resource that carries the tracking reference signal can be reduced.

(4) Joint transmission may mean that at least two network devices jointly send a downlink signal and a TRS to a terminal device. For example, as shown in FIG. 1, a terminal device moves from an area covered by a first network device to an area covered by a second network device, and there is a common coverage area between the first network device and the second network device. When the terminal device is located in the common coverage area, the first network device and the second network device may jointly send a downlink signal and a TRS to the terminal device. Specifically, when channel quality is poor, the first network device and the second network device send a same downlink signal to the terminal device, to increase a receive power of the downlink signal and improve communication quality. When the channel quality is good, the first network device and the second network device send different downlink signals to the terminal device, to improve transmission efficiency. A joint transmission area may be a common coverage area of the at least two network devices, or a subset of the common coverage area of the at least two network devices (as shown in FIG. 1).

(5) A first area may be an area in which a first network device and a second network device perform joint transmission, or an area in which the terminal device is handed over from the first network device to the second network device.

The area in which the first network device and the second network device perform joint transmission may be a common coverage area of the first network device and the second network device, or may be a subset of the common coverage area of the first network device and the second network device (as shown in FIG. 1).

Figure 2:
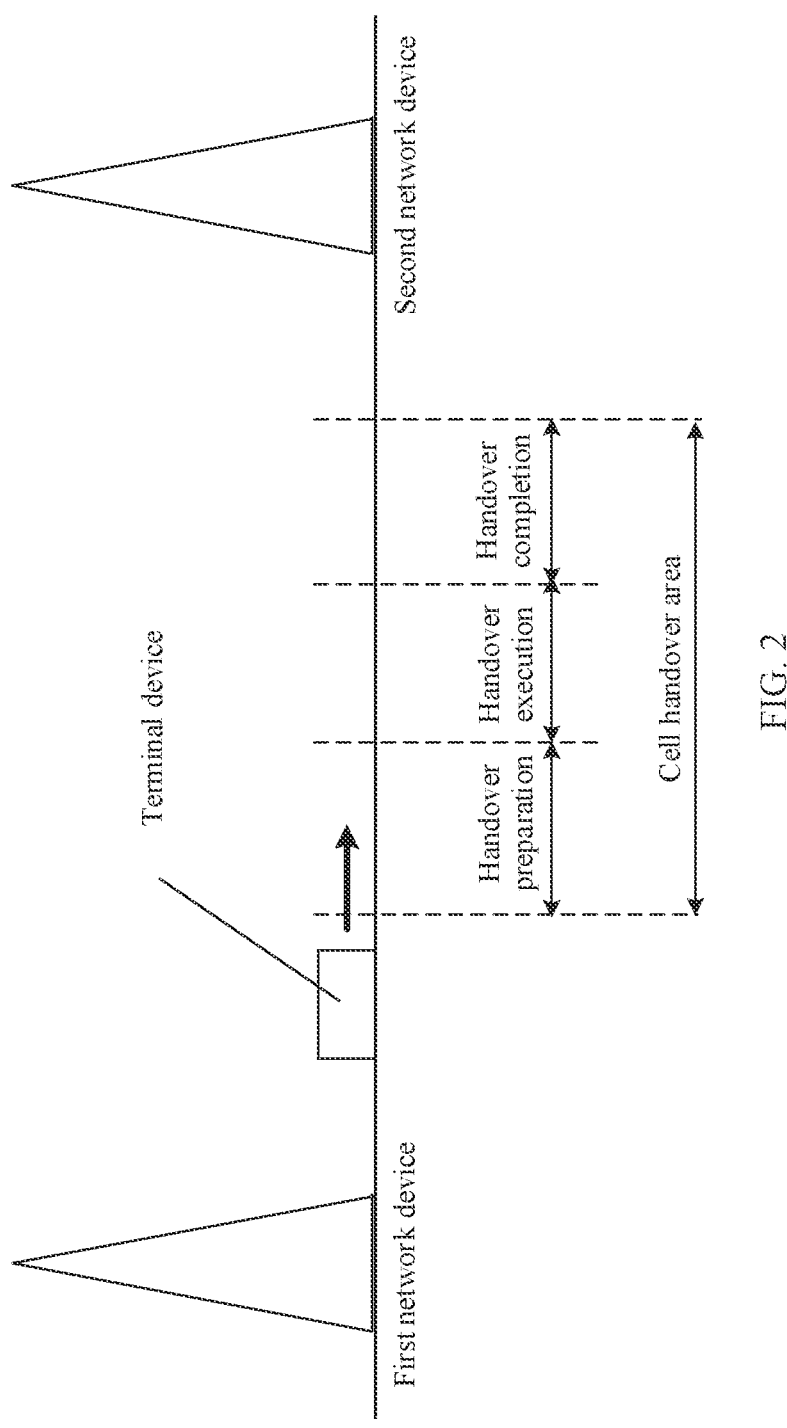
FIG. 2 is a schematic diagram of a cell handover area according to an embodiment of this application.

The area in which the terminal device is handed over from the first network device to the second network device may also be referred to as an area in which the terminal device is handed over. For example, as shown in FIG. 2, in a process in which the terminal device moves from an area covered by the first network device to an area covered by the second network device, the terminal device needs to be handed over, to be specific, handed over from the first network device to the second network device. That the terminal device is handed over from the first network device to the second network device may include one or more of a handover preparation phase, a handover execution phase, and a handover completion phase. For example, the handover preparation phase may be a phase from a time point at which the first network device sends a handover request to the second network device to a time point at which the first network device sends a handover command to the terminal device. The handover execution phase may be a phase from a time point at which the terminal device receives the handover command to a time point at which the terminal device establishes a connection to the second network device. The handover completion phase may be a phase from a time point at which the terminal device establishes the connection to the second network device to a time point at which the terminal device starts to transmit data with the second network device.

The area in which the terminal device is handed over from the first network device to the second network device may be understood as an area in which the terminal device is located in a process in which the terminal device is handed over from the first network device to the second network device.

It should be noted that if the terminal device is handed over from the first network device to the second network device at a handover point, it means that duration required by the terminal device to perform cell handover is very short, and a cell handover area is very small. In this case, the first area may be an area including all possible handover points.

(6) A transmission configuration indicator-state (TCI-State) may indicate a correspondence between a tracking reference signal and a service. For example, the TCI-State may indicate a quasi-colocation (, QCL) relationship between a tracking reference signal and a service. The service may refer to physical downlink control channel (PDCCH) data and/or physical downlink shared channel (PDSCH) data. For example, a network device broadcasts a tracking reference signal, and a terminal device may receive a plurality of tracking reference signals. In this case, the terminal device may determine, in the plurality of tracking reference signals based on a TCI-State field in DCI, a tracking reference signal used to demodulate a PDCCH (and/or a PDSCH), to obtain PDCCH data (and/or PDSCH data). For example, a terminal device receives a plurality of tracking reference signals and a plurality of pieces of PDSCH data, the plurality of tracking reference signals may include a tracking reference signal 1 and a tracking reference signal 2, and the plurality of pieces of PDSCH data may include PDSCH data 1 and PDSCH data 2. If a TCI-State indicates that the tracking reference signal 1 and the PDSCH data 1 are in a QCL relationship, and the tracking reference signal 2 and the PDSCH data 2 are in the QCL relationship, based on the TCI-State, the terminal device may obtain PDSCH data 1 based on the tracking reference signal 1, and obtain the PDSCH data 2 based on the tracking reference signal 2.

Alternatively, the TCI-State may indicate a QCL relationship between a tracking reference signal and a demodulation reference signal (DMRS). For example, a network device broadcasts a tracking reference signal, and a terminal device may receive a plurality of tracking reference signals. In this case, the terminal device may determine, in the plurality of tracking reference signals based on a TCI-State field in DCI, a tracking reference signal used for a DMRS, to obtain PDCCH data (and/or PDSCH data) corresponding to the DMRS.

(7) A transmission configuration indicator-state carried in downlink control information (TCI-Present in DCI) is a field in air interface signaling, and may be used to determine whether the DCI includes the TCI-State. For example, if a network device configures the TCI-Present in DCI as "enabled (enabled)", the TCI-Present in the DCI indicates that DCI includes a TCI-State field. If the network device configures the TCI-Present in DCI as "disabled (inabled)", the TCI-Present in DCI indicates that the DCI does not include the TCI-State field.

(8) A tracking reference signal is used to track a time offset and a frequency offset in a communication process between a network device and a terminal device, to compensate for a time offset caused by an air interface transmission delay and a frequency offset caused by a Doppler effect. For example, the tracking reference signal may be a TRS, an SSB, or the like. This is not limited in embodiments of this application. An example in which the tracking reference signal is the TRS is used below for description. It may be understood that the technical solution applicable to the TRS in embodiments of this application is also applicable to the SSB.

(9) In embodiments of this application, "a plurality of" means two or more. In view of this, in embodiments of this application, "a plurality of" may also be understood as "at least two". "At least one" may be understood as one or more, for example, one, two, or more. For example, "include at least one" means "include one, two, or more", and does not limit which items are included. For example, "include at least one of A, B, and C" may mean "include A, B, or C", "include A and B, A and C, or B and C", or "include A, B, and C". The term "and/or" describes an association relationship between associated objects and indicates that three relationships may exist. For example, A and/or B may indicate the following three cases: Only A exists, both A and B exist, and only B exists. In addition, the character "/" generally indicates an "or" relationship between the associated objects.

Unless otherwise stated, in embodiments of this application, ordinal numbers such as "first", "second", and "third" are used to distinguish between a plurality of objects, and not intended to limit an order, a time sequence, a priority, or importance of the plurality of objects.

Technical solutions in embodiments of this application may be applied to various communication systems, for example, an LTE system, a 5G mobile communication system, such as a new radio (NR) system, and may be further applied to another future evolved communication system. This is not limited in embodiments of this application.

All aspects, embodiments, or features are presented in embodiments of this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in embodiments of this application is used to represent giving an example, an illustration, or a description. Any embodiment or design scheme described as an "example" in embodiments of this application should not be explained as being more preferred or having more advantages than another embodiment or design scheme. Exactly, the word "example" is used to present a concept in a specific manner.

A network architecture and a service scenario that are described in embodiments of this application are intended to describe the technical solutions in embodiments of this application more clearly, and do not constitute any limitation on the technical solutions provided in embodiments of this application. A person of ordinary skill in the art may know that, with evolution of the network architecture and emergence of a new service scenario, the technical solutions provided in embodiments of this application are also applicable to a similar technical problem.

In embodiments of this application, an NR network scenario is used as an example to describe some scenarios. It should be noted that the solutions in embodiments of this application may further be applied to another wireless communication network, and a corresponding name may also be replaced with a name of a corresponding function in the another wireless communication network.

For ease of understanding embodiments of this application, the following describes a communication system to which embodiments of this application are applicable.

Figure 3:
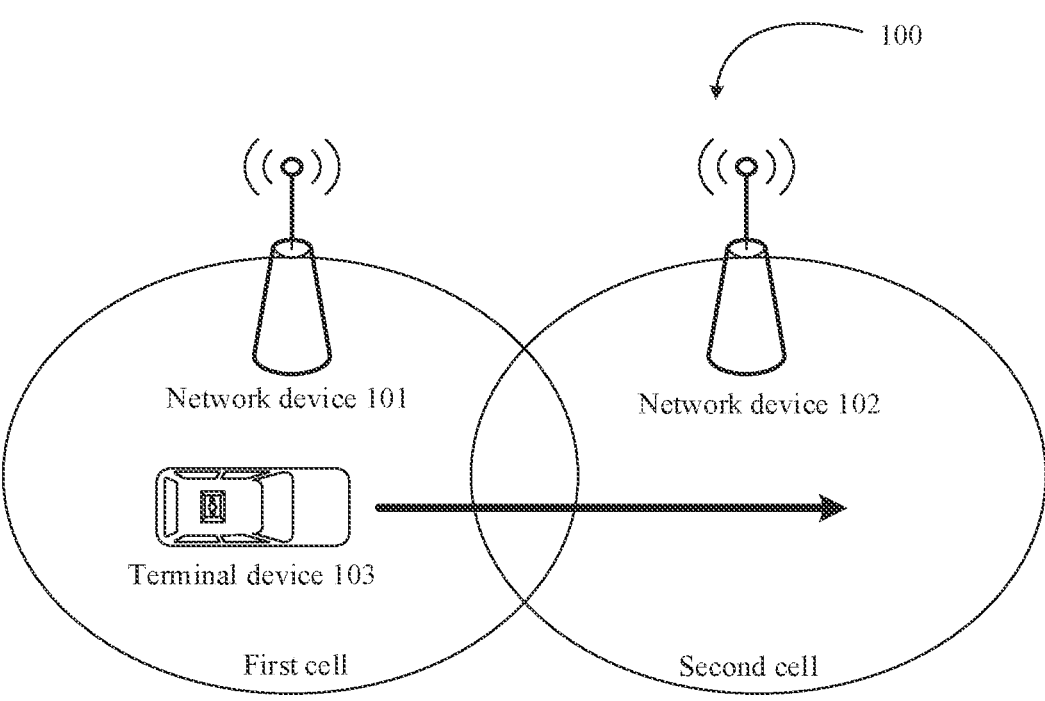
FIG. 3 is a schematic diagram of a structure of a communication system to which embodiments of this application are applicable.

FIG. 3 is a schematic diagram of a communication system to which embodiments of this application are applicable. As shown in FIG. 3, the communication system 100 may include a network device 101, a network device 102, and a terminal device 103. In a process in which the terminal device 103 moves along a thick line direction shown in FIG. 3, a serving cell of the terminal device 103 changes from a first cell to a second cell. The first cell may be referred to as a source cell of the terminal device 103, and the second cell may be referred to as a target cell of the terminal device 103. Correspondingly, the network device 101 to which the first cell belongs may be referred to as a source network device of the terminal device 103, and the network device 102 to which the second cell belongs may be referred to as a target network device of the terminal device 103. A plurality of antennas may be configured for the network device 101, a plurality of antennas may be configured for the network device 102, and a plurality of antennas may be configured for the terminal device 106. Before the terminal device 103 is handed over from the first cell to the second cell, the network device 101 may communicate with the terminal device 103. After the terminal device 103 is handed over from the first cell to the second cell, the network device 102 may communicate with the terminal device 103. In addition, the network device 101 or the network device 102 may further communicate with a terminal device other than the terminal device 103. Details are not described herein.

For example, a coverage area of the first cell may partially overlap a coverage area of the second cell (as shown in FIG. 3), in other words, there is a common coverage area between the network device 101 and the network device 102. It may be understood that the coverage area of the first cell may not overlap the coverage area of the second cell. This is not limited in this embodiment of this application. The network device 101 and the network device 102 may belong to a same combined cell, or may belong to different combined cells. This is not limited in this embodiment of this application.

It should be understood that FIG. 3 is only a simplified schematic diagram of an example for ease of understanding. The communication system may further include another network device or another terminal device. This is not limited in embodiments of this application.

The following describes some related technical features in embodiments of this application.

As described above, the terminal device may compensate, by measuring a TRS, for a time offset caused by an air interface transmission delay and a frequency offset generated due to impact of a Doppler effect, so that timing of the terminal device is synchronized with that of the network device, and a frequency of the terminal device is consistent with a frequency of a downlink signal. Therefore, communication quality is improved. The following uses the communication system shown in FIG. 3 as an example to describe, by using a scenario 1 and a scenario 2, a process in which the terminal device compensates for a time offset and a frequency offset by measuring a TRS. The scenario 1 is an initial phase after the terminal device completes cell handover, and the scenario 2 is an initial phase in which the network device 101 and the network device 102 perform joint transmission. The following provides descriptions by using examples in which the scenario 1 is the initial phase after the terminal device completes the cell handover and the first cell and the second cell belong to different combined cells, and the scenario 2 is the initial phase in which the network device 101 and the network device 102 perform joint transmission and the first cell and the second cell belong to a same combined cell.

Scenario 1: In the initial phase in which the terminal device 103 is handed over from the first cell to the second cell, a process in which the terminal device 103 compensates for a time offset and a frequency offset by measuring a TRS is as follows:

Step A1: After the terminal device 103 accesses the second cell, the network device 102 configures, for the terminal device 103 by using RRC signaling, a time-frequency resource carrying a TRS. Correspondingly, the terminal device 103 receives information about the time-frequency resource carrying the TRS.

Step A2: The network device 102 broadcasts the TRS, and sends MAC-CE signaling to the terminal device 103. Correspondingly, the terminal device 103 may receive the MAC-CE signaling, and receive the TRS based on the time-frequency resource carrying the TRS. The MAC-CE signaling may indicate to measure the TRS.

Step A3: The terminal device 103 may measure the TRS based on the MAC-CE signaling, to obtain a measurement result. The measurement result may include at least one of a time offset estimated value or a frequency offset estimated value.

Step A4: The network device 102 sends DCI signaling and a downlink signal to the terminal device 103. Correspondingly, the terminal device 103 receives the DCI signaling and the downlink signal. The DCI signaling may indicate to demodulate the downlink signal based on the measurement result. The downlink signal may be a PDCCH, a PDSCH, or a PDCCH and a PDSCH, or the like. This is not limited in this application.

Step A5: The terminal device 103 demodulates the downlink signal based on the measurement result.

In the initial phase after the terminal device 103 completes the cell handover, the terminal device 103 can start to measure the TRS only after receiving the MAC-CE signaling of the network device 102 and the information about the time-frequency resource that carries the TRS and that is configured by the network device 102 for the terminal device 103. This means that the terminal device 103 needs to wait for long duration before starting to measure the TRS. Within the waiting duration, if the terminal device 103 receives the downlink signal of the network device 102, the terminal device 103 directly demodulates the downlink signal instead of waiting for completion of the measurement on the TRS before demodulating the downlink signal. Because the terminal device 103 has not measured the TRS (or has not completed the measurement on the TRS), the terminal device 103 cannot compensate for a time offset caused by an air interface transmission delay and a frequency offset caused by a Doppler effect. Therefore, demodulation performance of the downlink signal is reduced, and communication quality is reduced.

It should be noted that an execution sequence of step A1 to step A5 is not limited in embodiments of this application. For example, the terminal device 103 may receive the TRS from the network device 102 before accessing the second cell. For another example, the network device 102 may simultaneously send the TRS and the MAC-CE signaling to the terminal device 103; or may first broadcast the TRS, and then send the MAC-CE signaling to the terminal device 103.

Scenario 2: In the initial phase in which the terminal device 103 performs joint transmission, a process in which the terminal device 103 compensates for a time offset and a frequency offset by measuring a TRS is as follows:

Step B1: The network device 102 broadcasts a TRS, and sends MAC-CE signaling to the terminal device 103. Correspondingly, the terminal device 103 receives the TRS and the MAC-CE signaling. The MAC-CE signaling may indicate to measure the TRS.

Step B2: The terminal device 103 may determine, based on a resource pool of a combined cell, a time-frequency resource carrying the TRS, and measure the TRS based on the determined time-frequency resource, to obtain a measurement result.

Step B3: The network device 102 sends DCI signaling and a downlink signal to the terminal device 103. Correspondingly, the terminal device 103 receives the DCI signaling and the downlink signal. The DCI signaling may indicate to demodulate the downlink signal based on the measurement result. The downlink signal may be a PDCCH, a PDSCH, or a PDCCH and a PDSCH, or the like. This is not limited in this application.

Step B4: The terminal device 103 demodulates the downlink signal based on the measurement result.

In the scenario 2, because the network device 101 and the network device 102 belong to the same combined cell, when the terminal device accesses the combined cell, a primary network device in the combined cell (for example, the network device 102, the network device 102, or another network device in the combined cell) may configure, to the terminal device by using RRC signaling, a time-frequency resource carrying a TRS of each network device. This means that the network device 102 does not need to configure, for the terminal device, a time-frequency resource carrying a TRS. Although time overheads of configuring, by the network device 102 for the terminal device 103, the time-frequency resource carrying the TRS are reduced in the scenario 2, after the terminal device 103 enters a joint transmission area, the terminal device 103 can start to measure the TRS only after receiving the MAC-CE signaling from the network device 102 and determining the time-frequency resource carrying the TRS in the resource pool of the combined cell. This means that the terminal device 103 still needs to wait for long duration before starting to measure the TRS. Similarly, within the waiting duration, if the terminal device 103 receives the downlink signal of the network device 102, the terminal device 103 directly demodulates the downlink signal instead of waiting for completion of the measurement on the TRS before demodulating the downlink signal. Because the terminal device 103 has not measured the TRS (or has not completed the measurement on the TRS), the terminal device 103 cannot compensate for a time offset caused by an air interface transmission delay and a frequency offset caused by a Doppler effect. Therefore, demodulation performance of the downlink signal is reduced, and communication quality is reduced.

It should be noted that an execution sequence of step B1 to step B4 is not limited in embodiments of this application. For example, the terminal device 103 may receive the TRS from the network device 102 before entering the joint transmission area. For another example, the network device 102 may simultaneously send the TRS and the MAC-CE signaling to the terminal device 103; or may first broadcast the TRS, and then send the MAC-CE signaling to the terminal device 103.

It can be learned from the foregoing descriptions of the scenario 1 and the scenario 2 that, in the initial phase after the terminal device completes the cell handover and the initial phase of the joint transmission, the terminal device needs to wait for long duration before starting to measure the TRS. In other words, the terminal device cannot compensate, in time based on the TRS measurement result, for the time offset caused by the air interface transmission delay and the frequency offset caused by the Doppler effect. Consequently, the demodulation performance of the downlink signal in the waiting duration is reduced, and the communication quality is reduced.

In view of this, an embodiment of this application provides a communication method, to reduce a delay of TRS measurement performed by a terminal device in an initial phase after cell handover is completed or in an initial phase of joint transmission, and improve communication quality. In the method, the first network device may send first indication information to the terminal device before the terminal device enters the first area. The first area may be an area in which the terminal device is handed over from a first network device to a second network device, or an area in which the first network device and the second network device perform joint transmission. Therefore, the terminal device can measure a first TRS before the terminal device performs cell handover (or before the terminal device performs joint transmission). In this case, after performing cell handover (or performing joint transmission), the terminal device may directly demodulate a downlink signal based on a measurement result. In this manner, time overheads of measuring the TRS by the terminal device in the initial phase after the cell handover is completed (or the initial phase of the joint transmission) can be reduced. In other words, the terminal device can track a time offset and a frequency offset in time in the initial phase after the cell handover is completed (or the initial phase of the joint transmission). This can avoid a problem that demodulation performance is reduced because the terminal device does not compensate for the time offset and the frequency offset in time, and improve communication quality.

Figure 4:
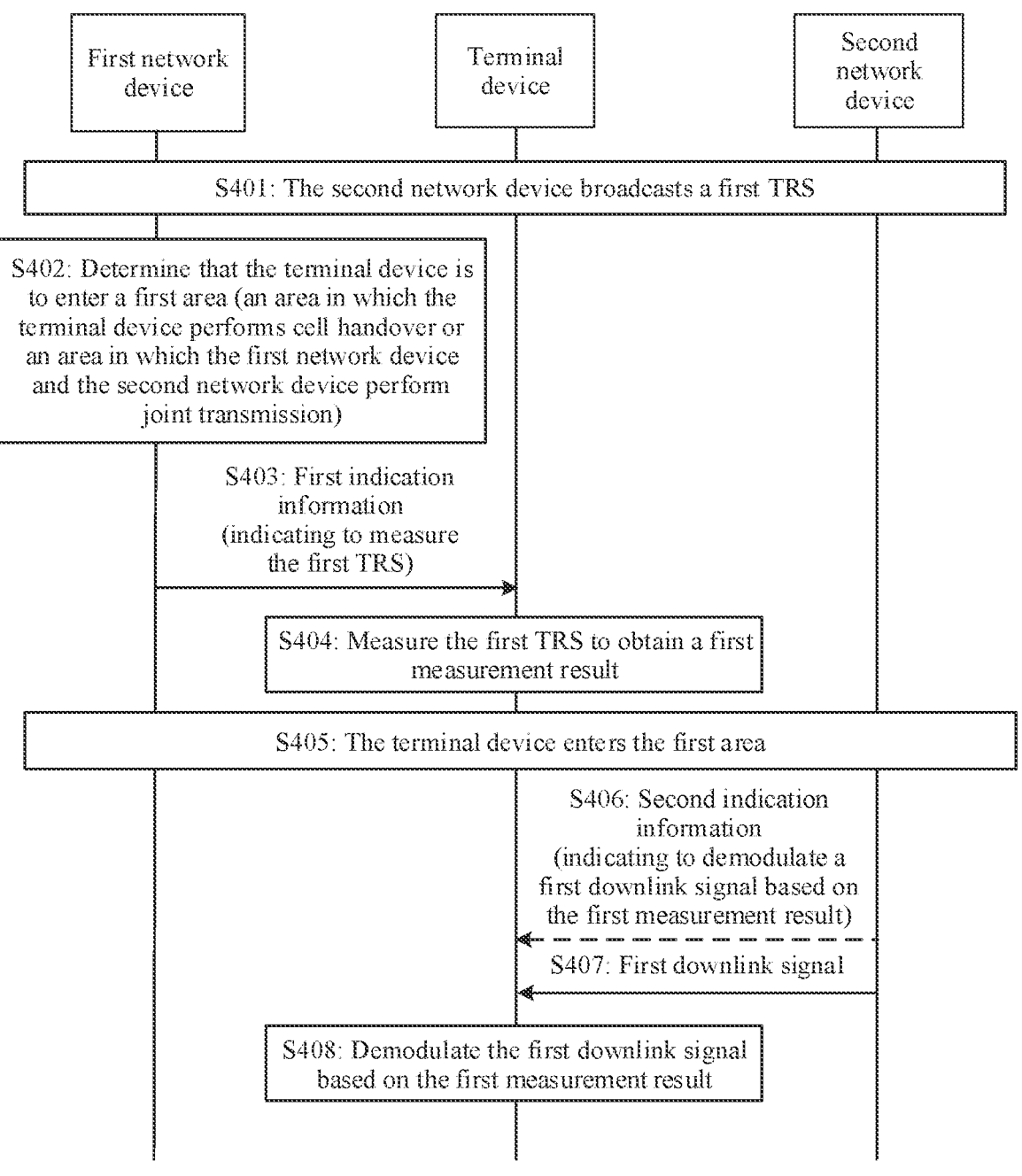
FIG. 4 is a schematic flowchart of a communication method according to an embodiment of this application.

FIG. 4 is a schematic flowchart of a communication method according to an embodiment of this application. The method may be applied to the communication system 100 shown in FIG. 3, and dashed lines in FIG. 4 are optional steps. In this embodiment of this application, a terminal device may be the terminal device 103 shown in FIG. 3, a first network device may be the network device 101 shown in FIG. 3, and a second network device may be the network device 102 shown in FIG. 3. It should be understood that, in this embodiment of this application, a step performed by the network device may also be specifically performed by a module or a component of the network device, for example, may be performed by a chip or a chip system in the network device; and a step performed by the terminal device may also be specifically performed by a module or a component of the terminal device, for example, may be performed by a chip or a chip system in the terminal device. As shown in FIG. 4, the method may include the following steps.

S401: The second network device broadcasts a first TRS. Correspondingly, the terminal device receives the first TRS.

For example, the second network device may periodically or aperiodically broadcast the first TRS. Correspondingly, before the terminal device enters a first area, the terminal device may receive the first TRS from the second network device.

In an example, the first area may be an area in which the terminal device is handed over from the first network device to the second network device. The area in which the terminal device is handed over from the first network device to the second network device may also be referred to as an area in which the terminal device performs cell handover. For example, the cell handover performed by the terminal device may include a handover preparation phase, a handover execution phase, and a handover completion phase, as shown in FIG. 2. For another example, the area in which the terminal device performs cell handover may be a common coverage area of the first network device and the second network device, or a subset of the common coverage area of the first network device and the second network device. This is not limited in embodiments of this application. In this case, the first network device may be a source device for the cell handover performed by the terminal device, and the second network device may be a target device for the cell handover performed by the terminal device.

In another example, the first area may alternatively be an area in which the first network device and the second network device perform joint transmission. For example, the area in which the first network device and the second network device perform joint transmission may be a common coverage area of the first network device and the second network device. For another example, the area in which the first network device and the second network device perform joint transmission may alternatively be a subset of the common coverage area of the first network device and the second network device, as shown in FIG. 1.

When the first area is the area in which the first network device and the second network device perform joint transmission, the terminal device performs cell handover in a process of moving to a second terminal device in the first area. An area in which the terminal device performs cell handover may be a subset of the area in which the first network device and the second network device perform joint transmission, as shown in FIG. 1.

In other words, the terminal device is handed over from the first network device to the second network device in an area in the first area. In this case, in a time period from a time point at which the terminal device enters the first area to a time point at which the terminal device starts to perform cell handover, the first network device may be a primary network device in joint transmission between the first network device and the second network device. In a time period from a time point at which the terminal device completes the cell handover to a time point at which the terminal device leaves the first area, the second network device may be a primary network device in joint transmission between the first network device and the second network device.

A primary network device in joint transmission may be configured to adjust a joint transmission manner based on channel quality (for example, send a same downlink signal to a terminal device or send different downlink signals to the terminal device). For example, the primary network device in the joint transmission is the first network device. When it is detected that channel quality is poor, the first network device may indicate the second network device to send a downlink signal that is the same as that of the first network device to the terminal device, so as to increase a receive power of the downlink signal and improve communication quality. For another example, when it is detected that channel quality is good, the first network device may indicate the second network device to send a downlink signal that is different from that of the first network device to the terminal device, to improve transmission efficiency.

It may be understood that in embodiments of this application, the technical solution applicable to cell handover is also applicable to cell handover in a joint transmission area.

S402: The first network device determines that the terminal device is to enter the first area.

For example, the first network device may determine, based on reference signal received quality (RSRP), or a movement direction of the terminal device and information about a network topology in which the first network device is located, whether the terminal device is to enter the first area. The topology information of the network in which the first network device is located may include but is not limited to an identifier of at least one neighboring cell, an identifier of at least one network device adjacent to the first network device, location information (for example, longitude information and/or latitude information) of the at least one network device adjacent to the first network device, a location relationship between the at least one network device and the first network device (for example, located in the due north of the first network device, or located in the due south of the first network device), or a relative location of the at least one network device (for example, a location relative to the first network device).

In an example, the first network device may determine, based on the RSRP, whether the terminal device is to enter the first area. For example, the terminal device may periodically report a first RSRP to the first network device, and the first network device receives the first RSRP. The first RSRP may be an RSRP of a sounding reference signal (SRS). The first network device determines, based on the first RSRP, whether the terminal device is to enter the first area.

For example, the first network device may compare the first RSRP with one or more RSRPs of the terminal device in one or more neighboring cells, to determine whether the terminal device is to enter the first area. If differences between the first RSRP and the one or more RSRPs of the terminal device in the one or more neighboring cells in a plurality of consecutive periodicities are less than or equal to a first threshold, the first network device may determine that the terminal device is to enter the first area. Alternatively, if the first RSRP is less than or equal to one or more RSRPs of the terminal device in the one or more neighboring cells in a plurality of consecutive periodicities, the first network device may determine that the terminal device is to enter the first area.

For another example, the first network device may compare the first RSRP with an RSRP of the terminal device in a strongest neighboring cell, to determine whether the terminal device is to enter the first area. If differences between the first RSRP and the RSRP of the terminal device in the strongest neighboring cell in a plurality of consecutive periodicities are less than or equal to a first threshold, the first network device may determine that the terminal device is to enter the first area. The strongest neighboring cell may be a cell whose detected RSRP is the best, other than a cell covered by the first network device (namely, the first cell).

In another example, the first network device may determine, based on a movement method of the terminal device and the topology information of the network in which the first network device is located, whether the terminal device is to enter the first area. For example, the first network device may obtain, based on the topology information of the network in which the first network device is located and the movement direction, an identifier of a second cell (or an identifier of the second network device) to which the terminal device is to be handed over in the movement direction, and determine a distance between the second network device and the current terminal device based on the identifier of the second cell (or the identifier of the second network device). When the distance between the second network device and the current terminal device is less than or equal to a second threshold, the first network device determines that the terminal device is to enter the first area.

S403: The first network device sends first indication information to the terminal device. Correspondingly, the terminal device receives the first indication information.

For example, the first indication information may be MAC-CE signaling, and the first indication information may indicate the terminal device to measure the first TRS. For another example, the first indication information may include second information, and the second information may include at least one of information such as an identifier of the first TRS, information about a time-frequency resource carrying the first TRS, or a number of a TCI-State corresponding to the first TRS. If the first area is an area in which the terminal device performs cell handover, the first TRS may be a TRS sent by the second network device. Alternatively, if the first area is an area in which the first network device and the second network device perform joint transmission, the first TRS may be a TRS jointly sent by the first network device and the second network device.

S404: The terminal device measures the first TRS based on the first indication information, to obtain a first measurement result.

For example, the terminal device measures the first TRS to obtain the first measurement result, where the first measurement result may include a time offset estimated value and/or a frequency offset estimated value for arrival of a first downlink signal at the terminal device.

S405: The terminal device enters the first area.

For example, if the first area is an area in which the terminal device performs cell handover, the terminal device enters the first area and performs cell handover. If the first area is an area in which the first network device and the second network device perform joint transmission, the terminal device enters the first area and performs joint transmission with the first network device and the second network device.

Optionally, after the terminal device enters the first area, the second network device may send second indication information and the first downlink signal to the terminal device, to indicate the terminal device to demodulate the first downlink signal based on the first measurement result, that is, perform content shown in step S406 to step S408. Alternatively, after the terminal device enters the first area, the second network device may not send the second indication information to the terminal device. In other words, by default, the terminal device may directly demodulate the first downlink signal by using the first measurement result, that is, perform content shown in step S407 and step S408.

S406: The second network device sends the second indication information to the terminal device. Correspondingly, the terminal device receives the second indication information.

The second indication information may be DCI signaling, and the second indication information may indicate to demodulate the first downlink signal based on the first measurement result. For example, after determining that the terminal device enters the first area, the second network device may send the second indication information to the terminal device, and the terminal device receives the second indication information. For example, if the first area is an area in which the terminal device performs cell handover, the second network device may send the second indication information to the terminal device after the terminal device completes the cell handover (for example, the second network device may determine, based on a cell handover complete instruction of the terminal device, that the terminal device completes the cell handover, that is, after the second network device establishes an RRC connection to the terminal device). Alternatively, if the first area is an area in which the first network device and the second network device perform joint transmission, the second network device may send the second indication information to the terminal device after the terminal device enters the area in which the first network device and the second network device perform joint transmission (for example, the second network device may determine, based on a joint transmission instruction of the first network device, that the terminal device enters the first area, and in this case, the terminal device has not performed cell handover).

S407: The second network device sends the first downlink signal to the terminal device. Correspondingly, the terminal device receives the first downlink signal.

The first downlink signal may be a PDCCH, a PDSCH, or a PDCCH and a PDSCH. This is not limited in this embodiment of this application. For example, after determining that the terminal device enters the first area, the second network device may send the first downlink signal to the terminal device, and the terminal device receives the first downlink signal. For example, if the first area is an area in which the terminal device performs cell handover, the second network device may send the first downlink signal to the terminal device after the terminal device completes the cell handover (for example, the second network device may determine, based on a cell handover complete instruction of the terminal device, that the terminal device completes the cell handover). Alternatively, if the first area is an area in which the first network device and the second network device perform joint transmission, the second network device may send the first downlink signal to the terminal device after the terminal device enters the first area (for example, the second network device may determine, based on a joint transmission instruction of the first network device, that the terminal device enters the first area).

S408: The terminal device demodulates the first downlink signal based on the first measurement result.

For example, after receiving the first downlink signal, the terminal device may immediately adjust a crystal oscillator of the terminal device based on the time offset estimated value and the frequency offset estimated value in the first measurement result, to compensate for a time offset of the first downlink signal caused by an air interface transmission delay and compensate for a frequency offset caused by a Doppler effect, so that timing of the terminal device is synchronized with that of the second network device, and a receive frequency of the terminal device is consistent with a frequency of the first downlink signal.

For example, the terminal device may adjust the crystal oscillator in the following manner: When a next crystal oscillator adjustment moment arrives, the terminal device does not perform historical value filtering on a frequency offset record of the crystal oscillator of the terminal device, but directly writes the time offset estimated value and the frequency offset estimated value in the first measurement result. The historical value may be a measurement result of a second TRS, and the second TRS is a TRS broadcast by the first network device. In this manner, because the crystal oscillator is not adjusted in one step, when the terminal device completes an initial phase after accessing the second cell, the crystal oscillator of the terminal device may not complete filtering based on the measurement result of the second TRS. Therefore, after the terminal device receives the second indication information, the terminal device may directly perform filtering based on the first measurement result. This can reduce time overheads of compensating for the time offset and the frequency offset by the terminal device, and improve reliability.

It should be noted that an execution sequence of step S401 to step S408 in FIG. 4 is merely an example. This is not limited in this embodiment of this application. For example, the second network device may broadcast the first TRS before step S402, or may broadcast the first TRS after step S402, provided that it is ensured that the terminal device receives the first TRS before entering the first area. For another example, the first network device may separately perform step S406 and step S407, or may simultaneously perform step S406 and step S407, or may perform only step S407 but not step S406.

The following describes the communication method shown in FIG. 4 in detail with reference to an example 1 and an example 2.

Example 1

Figure 5A:
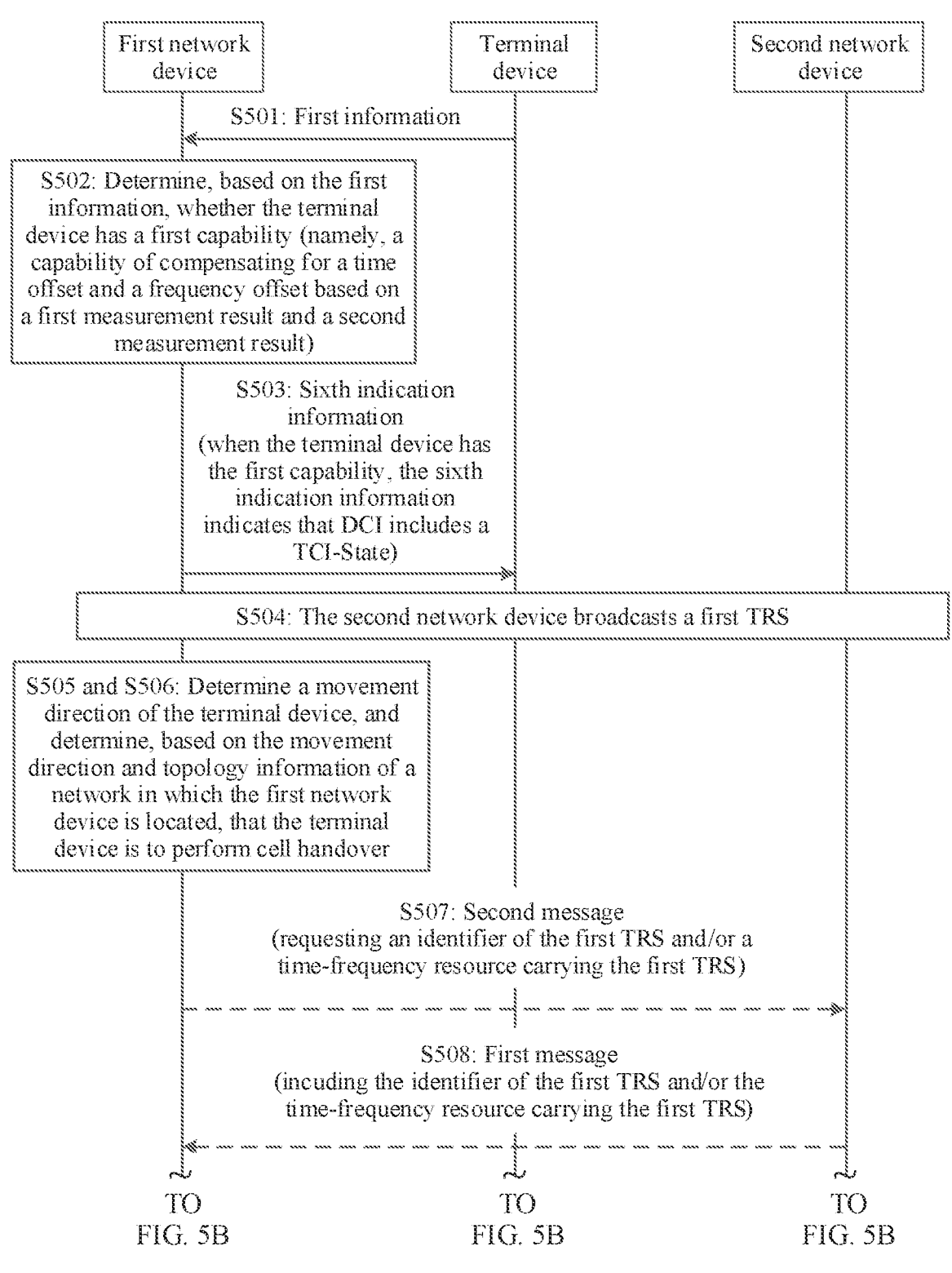
FIG. 5A and FIG. 5B are a schematic flowchart of another communication method according to an embodiment of this application.
Figure 5B:
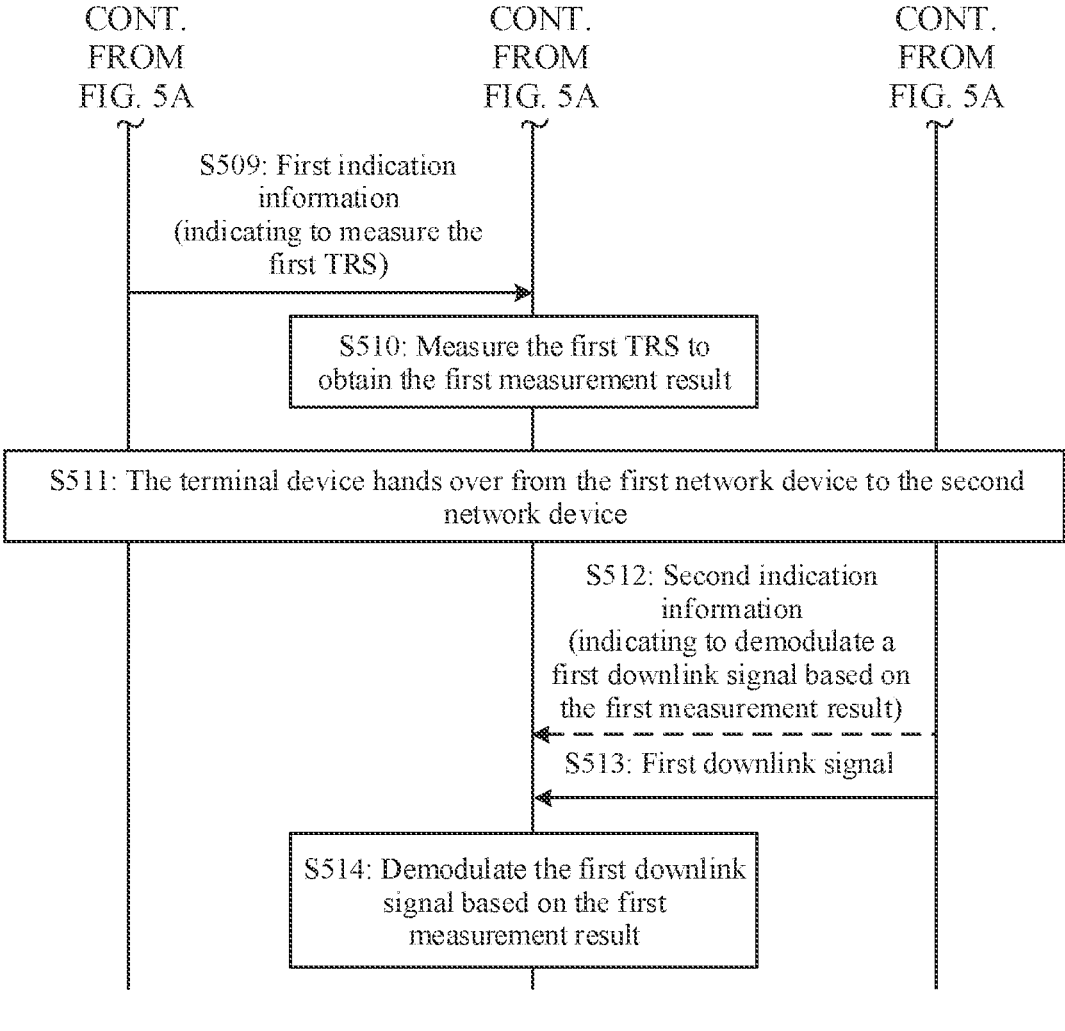

FIG. 5A and FIG. 5B show a communication method according to an embodiment of this application. The method may be performed by a terminal device and a network device, or may be performed by a chip in the terminal device and a chip in the network device. In FIG. 5A and FIG. 5B, a first network device may be the network device 101 in FIG. 3, a second network device may be the network device 102 in FIG. 3, and a terminal device may be the terminal device 103 in FIG. 3. In the example 1, a first area is an area in which the terminal device performs cell handover, and the terminal device may complete measurement on a first TRS before performing cell handover, so that the terminal device can demodulate a first downlink signal of the second network device in time based on the measurement result of the first TRS. The method shown in FIG. 5A and FIG. 5B may include the following steps.

S501: The terminal device sends first information to the first network device. Correspondingly, the first network device receives the first information.

For example, the first information may include a first quantity and a second quantity, the first quantity may be a quantity of simultaneously activated TCI-States supported by the terminal device, and the second quantity may be a quantity of simultaneously measured TRSs supported by the terminal device. The TCI-State may indicate a correspondence between a TRS and a service, for example, a quasi co-location relationship between a TRS and a service. The service may be PDCCH data and/or PDSCH data.

For example, when establishing a connection (for example, initial access, cell handover access, or RRC connection resume) to the first network device, the terminal device may report, to the first network device, a quantity of simultaneously activated TCI-States supported by the terminal device and a quantity of simultaneously measured TRSs supported by the terminal device, so that the first network device may determine, based on content reported by the terminal device, whether the terminal device has a first capability. The first capability may be a capability of compensating for a time offset and a frequency offset based on the measurement result of the first TRS and a measurement result of a second TRS; or the first capability may be a capability of simultaneously measuring at least two TRSs (for example, the first TRS and a second TRS) and compensating for a time offset and a frequency offset based on the measurement result of the first TRS and a measurement result of the second TRS. The second TRS is a TRS of the first network device.

That the terminal device has the capability of compensating for the time offset and the frequency offset based on the measurement result of the first TRS and the measurement result of the second TRS may be understood as follows: The terminal device supports switching, without interruption (or quickly), from adjusting a crystal oscillator based on the measurement result of the second TRS to adjusting the crystal oscillator based on the measurement result of the first TRS.

For example, compensating for the time offset and the frequency offset based on the measurement result of the first TRS and the measurement result of the second TRS may include: increasing filtering coefficients of the crystal oscillator for the time offset and the frequency offset based on the measurement result of the first TRS; or setting filtering coefficients of the crystal oscillator for the time offset and the frequency offset to 1. For example, the terminal device may increase the filtering coefficients of the crystal oscillator for the time offset and frequency offset (or set the filtering coefficients of the crystal oscillator for the time offset and frequency offset to 1) based on the following steps.

Step C1: The terminal device receives the first downlink signal (or second indication information and the first downlink signal) from the second network device. For a specific implementation process, refer to step S407 (or step S406 and step S407) in FIG. 3.

Step C2: After receiving the first downlink signal (or the second indication information and the first downlink signal), the terminal device immediately determines whether a first measurement result exists. If the first measurement result exists, step C3 is performed. If the first measurement result does not exist or a part of the first measurement result exists (for example, the terminal device has not completed measurement on a first tracking reference signal), the procedure ends (to be specific, the filtering coefficients of the crystal oscillator for the time offset and the frequency offset are not increased or the filtering coefficients of the crystal oscillator for the time offset and the frequency offset are not set to 1).

Step C3: The terminal device determines stability of the first measurement result. If the stability of the first measurement result is greater than or equal to a fifth threshold, step C4 is performed. If the stability of the first measurement result is less than the fifth threshold, the procedure ends (to be specific, the filtering coefficients of the crystal oscillator for time offset and frequency offset are not increased or the filtering coefficients of the crystal oscillator for the time offset and the frequency offset are not set to 1). For example, the terminal device may determine the stability of the first measurement result based on channel quality, channel correlation, or the like.

Step C4: The terminal device increases the filtering coefficients of the crystal oscillator for the time offset and frequency offset based on the first measurement result (or sets the filtering coefficients of the crystal oscillator for the time offset and frequency offset to 1).

The terminal device may increase the filtering coefficients of the crystal oscillator for the time offset and frequency offset (or set the filtering coefficients of the crystal oscillator for the time offset and frequency offset to 1) based on the content shown in step C1 to step C4. Because the filtering coefficients of the crystal oscillator for the time offset and frequency offset are increased (or the filtering coefficients of the crystal oscillator for the time offset and frequency offset are 1), filtering duration of the crystal oscillator for the time offset and frequency offset is shortened. This means that a delay between a time point at which the terminal device receives the first downlink signal and a time point at which the terminal device demodulates the first downlink signal based on the first measurement result can be reduced, so that the terminal device can quickly adjust the crystal oscillator based on the first measurement result to quickly compensate for the time offset and frequency offset. Therefore, demodulation performance of the first downlink signal can be improved, and communication quality can be improved.

S502: The first network device determines, based on the first information, whether the terminal device has the first capability.

For example, if the first quantity is greater than or equal to 2 and the second quantity is greater than or equal to 2, the first network device may determine that the terminal device has the first capability, that is, perform the content shown in step S503 to step S514. Alternatively, if the first quantity is less than 2 or the second quantity is less than 2, the first network device may determine that the terminal device does not have the first capability, that is, the procedure ends.

The terminal device may report the first information to the first network device, and the first network device determines, based on the first information, whether the terminal device has the first capability, that is, perform the content shown in step S501 and step S502. In a possible implementation, the terminal device may alternatively directly determine, based on third indication information, that the terminal device has the first capability. The third indication information may indicate that the terminal device has the first capability. For example, the terminal device may send the third indication information to the first network device, and correspondingly, the first network device receives the third indication information. After receiving the third indication information, the first network device may directly determine, based on the third indication information, that the terminal device has the first capability, and does not need to determine, based on the first quantity and the second quantity, whether the terminal device has the first capability.

S503: The first network device sends sixth indication information to the terminal device.

For example, the sixth indication information may indicate that DCI includes a TCI-State. For example, after determining that the terminal device has the first capability, the first network device may send air interface signaling to the terminal device, where the air interface signaling includes a first field (namely, the sixth indication information). The first network device may configure the first field as "enabled", to indicate that the DCI includes the TCI-State. In this way, after receiving the DCI, the terminal device may determine a correspondence between the first TRS and a service based on the TCI-State included in the DCI. The first field may be a TCI-present in DCI field.

S504: The second network device broadcasts the first TRS. Correspondingly, the terminal device receives the first TRS.

For example, the second network device may periodically or aperiodically broadcast the first TRS. For a specific implementation process of step S504, refer to the content shown in step 401 in FIG. 4. Details are not described herein again.

S505: The first network device determines a movement direction of the terminal device.

For example, the first network device may determine the movement direction of the terminal device based on a first frequency offset from the terminal device. The first frequency offset may be obtained by the terminal device by measuring the second TRS, and the second TRS is a TRS broadcast by the first network device.

S506: The first network device determines, based on the movement direction of the terminal device and topology information of a network in which the first network device is located, that the terminal device is to enter the first area.

In this example, the first area is an area in which the terminal device performs cell handover. That the first network device determines that the terminal device is to enter the first area is that the first network device determines that the terminal device is to perform cell handover.

For example, the first network device may determine, based on the topology information of the network in which the first network device is located and the movement direction, whether the terminal device is to perform cell handover. Specifically, the first network device may obtain, based on the topology information of the network in which the first network device is located and the movement direction, an identifier of a second cell to which the terminal device is to be handed over in the movement direction, and determine, based on the identifier of the second cell, a distance between the second network device and the current terminal device. When the distance between the second network device and the current terminal device is less than or equal to a second threshold, the first network device determines that the terminal device is to perform cell handover.

The first network device may determine, based on the movement direction of the terminal device and the topology information of the network in which the first network device is located, that the terminal device is to perform cell handover, that is, perform the content shown in step S505 and step S506. In a possible implementation, the first network device may alternatively determine, by using a first RSRP reported by the terminal device, whether the terminal device is to perform cell handover.

For example, the first network device may compare the first RSRP with one or more RSRPs of the terminal device in one or more neighboring cells, to determine whether the terminal device is to perform cell handover. If differences between the first RSRP and the one or more RSRPs of the terminal device in the one or more neighboring cells in a plurality of consecutive periodicities are less than or equal to a first threshold, the first network device may determine that the terminal device is to perform cell handover. Alternatively, if the first RSRP is less than or equal to one or more RSRPs of the terminal device in the one or more neighboring cells in a plurality of consecutive periodicities, the first network device may determine that the terminal device is to perform cell handover.

For another example, the first network device may compare the first RSRP with an RSRP of the terminal device in a strongest neighboring cell, to determine whether the terminal device is to perform cell handover. If differences between the first RSRP and the RSRP of the terminal device in the strongest neighboring cell in a plurality of consecutive periodicities are less than or equal to a first threshold, the first network device may determine that the terminal device is to perform cell handover. The strongest neighboring cell may be a cell whose detected RSRP is the best, other than a cell covered by the first network device (namely, a first cell).

The first threshold may be greater than a third threshold. The third threshold may be a threshold used by the first network device to determine that the terminal device needs to perform cell handover. For example, when differences between the first RSRP and the one or more RSRPs of the terminal device in the one or more neighboring cells (or the strongest neighboring cell) in a plurality of consecutive periodicities are less than or equal to the third threshold, the first network device determines that the terminal device needs to perform cell handover. For example, the third threshold is −2 decibels (dB). Because a value of the first threshold is excessively small, the first network device cannot send first indication information to the terminal device before the terminal device performs cell handover, and the terminal device further needs to receive the first indication information or measure the first TRS in an initial phase after the cell handover is completed. Therefore, demodulation performance of the first downlink signal is reduced, and communication quality is reduced. Therefore, in the foregoing manner, it can be ensured that the terminal device completes the measurement on the first TRS before performing cell handover, so that the terminal device can demodulate the first downlink signal in time based on the measurement result of the first TSR in the initial phase after the cell handover is completed, so that the demodulation performance of the first downlink signal can be improved and the communication quality can be improved.

Optionally, if the first network device and the second network device belong to a same combined cell, the first network device may determine second information by using a resource pool of the combined cell, that is, step S507 and step S508 are not performed. Alternatively, if the first network device and the second network device belong to different combined cells, the first network device may perform step S507 and step S508 to obtain the second information. Alternatively, if the first network device and the second network device belong to different combined cells, the second network device may report the second information to the first network device, that is, perform only step S508.

S507: The first network device sends a second message to the second network device. Correspondingly, the second network device receives the second message.

For example, the second message may request to obtain the second information, and the second information may include at least one of an identifier of the first TRS, information about a time-frequency resource carrying the first TRS, a number of a TCI-State corresponding to the first TRS, or the like.

S508: The second network device sends a first message to the first network device. Correspondingly, the first network device receives the first message.

The first message may include the second information.

S509: The first network device sends the first indication information to the terminal device. Correspondingly, the terminal device receives the first indication information.

For example, the first indication information may indicate the terminal device to measure the first TRS. For example, the first indication information may be MAC-CE signaling. The first indication information includes the second information (or the first indication information includes at least one of the identifier of the first TRS, the information about the time-frequency resource carrying the first TRS, the number of the TCI-State corresponding to the first TRS, or the like). For example, the first network device may send MAC-CE signaling to the terminal device, and the MAC-CE signaling includes a second field. The first network device may configure the second field as the identifier of the first TRS, the number of the TCI-State corresponding to the first TRS, or the like, to indicate to measure the first TRS. The second field may be a TCI-State field.

S510: The terminal device measures the received first TRS based on the first indication information, to obtain the first measurement result.

For example, the second network device broadcasts a TRS to the outside, and the terminal device receives a plurality of TRSs. The terminal device may determine, based on the second information, the time-frequency resource carrying the first TRS, determine the first TRS in the plurality of TRSs based on the time-frequency resource carrying the first TRS, and measure the first TRS, to obtain the first measurement result. For example, the first measurement result may include a time offset estimated value and/or a frequency offset estimated value that are/is obtained when the downlink signal corresponding to the first TRS arrives at the terminal device. A specific implementation in which the terminal device measures the TRS is not limited in this embodiment of this application.

S511: The terminal device performs cell handover, to hand over from the first network device to the second network device.

A specific implementation in which the terminal device performs cell handover is not limited in this embodiment of this application.

Optionally, in the initial phase after the terminal device completes the cell handover, the second network device may send the second indication information and the first downlink signal to the terminal device, to indicate the terminal device to demodulate the first downlink signal based on the first measurement result, that is, perform the content shown in step S512 to step S514. Alternatively, in the initial phase after the terminal device completes the cell handover, the second network device may not send the second indication information to the terminal device. In other words, it is considered by default that the terminal device may directly demodulate the first downlink signal by using the first measurement result, that is, perform the content shown in step S513 and step S514.

S512: The second network device sends the second indication information to the terminal device. Correspondingly, the terminal device receives the second indication information.

The second indication information may be DCI signaling, and the second indication information may indicate to demodulate the first downlink signal based on the first measurement result. For example, the second indication information may be DCI signaling. The second network device may send DCI signaling to the terminal device, where the DCI signaling includes the second field. The second network device may configure the second field as the identifier of the first TRS, the number of the TCI-State corresponding to the first TRS, or the like, to indicate to demodulate the first downlink signal based on the first measurement result. The second field may include a TCI-State and the like.

S513: The second network device sends the first downlink signal to the terminal device. Correspondingly, the terminal device receives the first downlink signal.

The first downlink signal may be a PDCCH, a PDSCH, or a PDCCH and a PDSCH. This is not limited in this embodiment of this application.

S514: The terminal device demodulates the first downlink signal based on the first measurement result.

For a specific implementation process of step S512 to step S514, respectively refer to the content shown in step S406 to step S408 in FIG. 4. Details are not described herein again.

In a possible implementation, before step S511, to be specific, before the terminal device performs cell handover, the first network device broadcasts the second TRS, and the terminal device receives the second TRS; the first network device may send fourth indication information to the terminal device, and the terminal device receives the fourth indication information, where the fourth indication information may indicate to measure the second TRS; the terminal device measures the second TRS based on the fourth indication information, to obtain a second measurement result; the first network device may send fifth indication information and a second downlink signal to the terminal device, and the terminal device receives the fifth indication information and the second downlink signal, where the fifth indication information may indicate to demodulate the second downlink signal based on the second measurement result; and the terminal device demodulates the second downlink signal based on the second measurement result. In this manner, before the terminal device performs cell handover, the terminal device may simultaneously complete the measurement on the first TRS and the measurement on the second TRS. This reduces time overheads for the terminal device to complete the TRS measurement in the initial phase after the cell handover is completed, improves the demodulation performance of the first downlink signal, improves communication quality between the second network device and the terminal device, and further ensures demodulation performance of the second downlink signal and communication quality between the first network device and the terminal device, so that reliability of communication between the terminal device and the network device before and after the cell handover is improved.

The fourth indication information may be MAC-CE signaling, and the fourth indication information may include third information. The third information may include at least one of an identifier of the second TRS, information about a time-frequency resource carrying the second TRS, a number of a TCI-State corresponding to the second TRS, or the like.

For example, the first network device may send MAC-CE signaling to the terminal device, and the MAC-CE signaling includes a second field. The first network device may configure the second field as the identifier of the second TRS, the number of the TCI-State corresponding to the second TRS, or the like, to indicate to measure the second TRS. The fifth indication information may be DCI signaling, and the fifth indication information may include the third information. For example, the first network device may send DCI signaling to the terminal device, where the DCI signaling includes a second field. The first network device may configure the second field as the identifier of the second TRS, the number of the TCI-State corresponding to the second TRS, or the like, to indicate to demodulate the second downlink signal based on the second measurement result. The second field may be a TCI-State field. The second downlink signal may be a PDCCH, a PDSCH, or a PDCCH and a PDSCH. This is not limited in this embodiment of this application.

It should be noted that an execution sequence of step S501 to step S514 in FIG. 5A and FIG. 5B is merely an example. This is not limited in this embodiment of this application. For example, the second network device may broadcast the first TRS before step S504, or may broadcast the first TRS after step S505, provided that it is ensured that the terminal device receives the first TRS before performing cell handover. For another example, the first network device may send the first indication information to the terminal device after step S508, or may send the first indication information to the terminal device before step S507.

In the foregoing embodiment of this application, before determining that the terminal device is to perform cell handover, the first network device sends the first indication information to the terminal device, to indicate the terminal device to measure the first TRS from the second network device. In the initial phase after the terminal device completes the cell handover, the second network device sends the first downlink signal (or the second indication information and the first downlink signal) to the terminal device, so that the terminal device demodulates the first downlink signal based on the measurement result of the first TRS. Because the terminal device has completed the measurement on the first TRS before performing cell handover, the terminal device does not need to measure the first TRS in the initial phase after the cell handover is completed, and may directly demodulate the downlink signal based on the measurement result. This can reduce time overheads for obtaining the measurement result by the terminal device in the initial phase after the cell handover is completed, and avoid a problem that demodulation performance is reduced because the terminal device does not compensate for a time offset and a frequency offset in time, thereby improving communication quality between the second network device and the terminal device.

Example 2

Figure 6A:
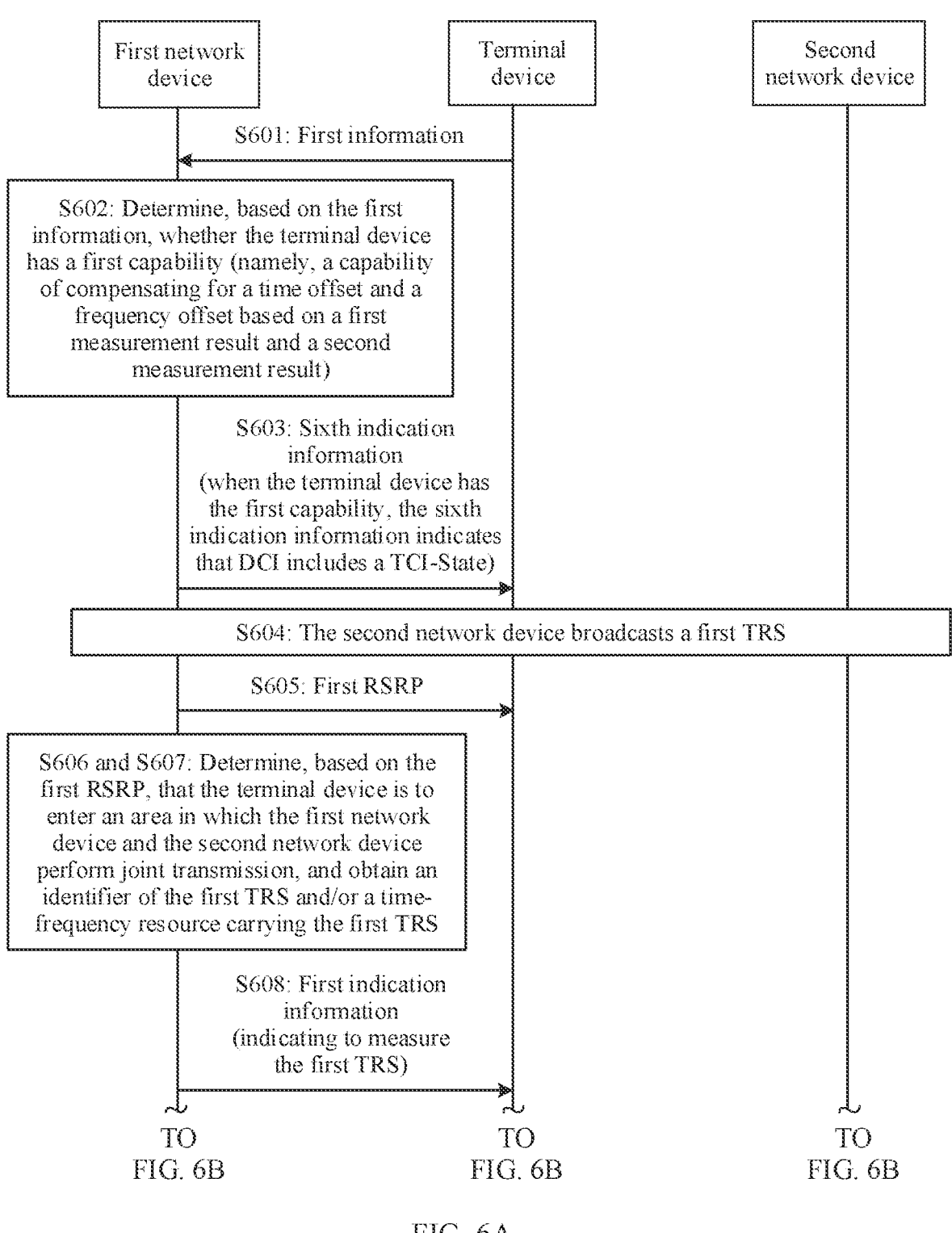
FIG. 6A and FIG. 6B are a schematic flowchart of still another communication method according to an embodiment of this application.
Figure 6B:
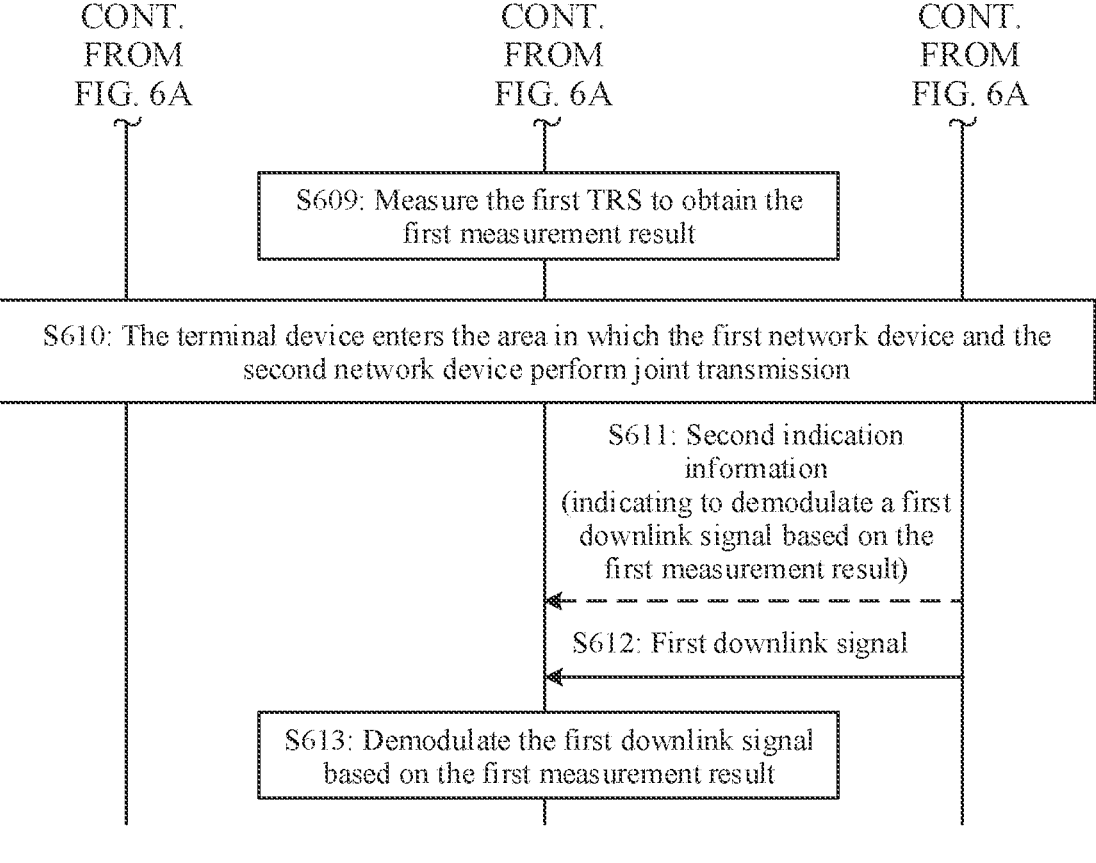

FIG. 6A and FIG. 6B are a schematic flowchart of another communication method according to an embodiment of this application. Dashed lines in FIG. 6A and FIG. 6B are optional steps. In the example 2, a first area is an area in which a first network device and a second network device performs joint transmission. A terminal device may complete measurement on a first TRS before entering the first area, so that the terminal device can demodulate a first downlink signal of the second network device in time based on a measurement result of the first TRS. Steps S601 to S604, S608, S609, and S611 to S613 are respectively the same as steps S501 to S504, S509, S510, and S512 to S514 in FIG. 5A and FIG. 5B. Differences lie in that:

S605: The terminal device sends a first RSRP to the first network device. Correspondingly, the first network device receives the first RSRP.

For example, the terminal device may periodically report the first RSRP to the first network device, and the first network device receives the first RSRP. The first RSRP may be an RSRP of an SRS. The first network device may determine, based on the first RSRP, that the terminal device enters a common coverage area of the first network device and the second network device and is to enter the joint transmission area to perform joint transmission.

S606: The first network device determines, based on the first RSRP, that the terminal device enters the common coverage area of the first network device and the second network device and is to enter the joint transmission area.

For example, the first network device may compare the first RSRP with one or more RSRPs of the terminal device in one or more neighboring cells, to determine whether the terminal device enters the common coverage area of the first network device and the second network device and is to enter the joint transmission area. If differences between the first RSRP and the one or more RSRPs of the terminal device in the one or more neighboring cells in a plurality of consecutive periodicities are less than or equal to a first threshold, the first network device may determine that the terminal device enters the common coverage area of the first network device and the second network device and is to enter the joint transmission area. Alternatively, if the first RSRP is less than or equal to one or more RSRPs of the terminal device in the one or more neighboring cells in a plurality of consecutive periodicities, the first network device may determine that the terminal device enters the common coverage area of the first network device and the second network device and is to enter the joint transmission area.

For another example, the first network device may compare the first RSRP with an RSRP of the terminal device in a strongest neighboring cell, to determine whether the terminal device enters the common coverage area of the first network device and the second network device and is to enter the joint transmission area. If differences between the first RSRP and the RSRP of the terminal device in the strongest neighboring cell in a plurality of consecutive periodicities are less than or equal to a first threshold, the first network device may determine that the terminal device enters the common coverage area of the first network device and the second network device and is to enter the joint transmission area. The strongest neighboring cell may be a cell whose detected RSRP is the best, other than a cell covered by the first network device (namely, a first cell).

The first threshold may be greater than a third threshold and greater than a fourth threshold. The third threshold may be a threshold used by the first network device to determine that the terminal device needs to perform cell handover. For example, when differences between the first RSRP and the one or more RSRPs of the terminal device in the one or more neighboring cells (or the strongest neighboring cell) in a plurality of consecutive periodicities are less than or equal to the third threshold, the first network device determines that the terminal device needs to perform cell handover. The fourth threshold may be a threshold that is determined by the first network device to perform joint transmission. For example, when differences between the first RSRP and the one or more RSRPs of the terminal device in the one or more neighboring cells (or the strongest neighboring cell) in a plurality of consecutive periodicities are less than or equal to the fourth threshold, the first network device determines to perform joint transmission. For example, the fourth threshold may be 6 dB. Because the joint transmission is performed after the terminal device enters the common coverage area of the first network device and the second network device and before the terminal device performs cell handover, an excessively small value of the first threshold causes a case in which the first network device cannot send first indication information to the terminal device before the terminal device enters the joint transmission area, so that the terminal device further needs to receive the first indication information or measure the first TRS in an initial phase of the joint transmission. Therefore, demodulation performance of the first downlink signal is reduced and communication quality is reduced. Therefore, in the foregoing manner, it can be ensured that the terminal device completes the measurement on the first TRS before performing joint transmission, so that the terminal device can demodulate the first downlink signal in time based on the measurement result of the first TSR in the initial phase of the joint transmission, so that the demodulation performance of the first downlink signal can be improved and the communication quality can be improved.

S607: The first network device obtains second information.

For example, the second information may include at least one of information such as an identifier of the first TRS, information about a time-frequency resource carrying the first TRS, or a number of a TCI-State corresponding to the first TRS. The first area is the area in which the first network device and the second network device performs joint transmission, and a joint transmission resource pool stores related information of each network device in the joint transmission (for example, an identifier of each network device, an identifier of a TRS of each network device, information about a time-frequency resource carrying the TRS of each network device, or a number of a TCI-State corresponding to the TSR of each network device), so that the first network device may directly obtain the second information from the joint transmission resource pool. Therefore, air interface resource overheads can be reduced, and air interface resource utilization can be improved.

S610: The terminal device enters the first area.

For example, in the example 2, the first area is the area in which the first network device and the second network device perform joint transmission, as shown in FIG. 1. That the terminal device enters the first area is that the terminal device enters the area in which the first network device and the second network device perform joint transmission, and performs joint transmission.

In a possible implementation, before step S609, to be specific, before the terminal device enters the joint transmission area, the first network device may broadcast a second TRS, and the terminal device receives the second TRS; the first network device may send fourth indication information to the terminal device, and the terminal device receives the fourth indication information, where the fourth indication information may indicate to measure the second TRS; the terminal device measures the second TRS based on the fourth indication information, to obtain a second measurement result; the first network device may send fifth indication information and a second downlink signal to the terminal device, and the terminal device receives the fifth indication information and the second downlink signal, where the fifth indication information may indicate to demodulate the second downlink signal based on the second measurement result; and the terminal device demodulates the second downlink signal based on the second measurement result. In this manner, before the terminal device enters the joint transmission area, the terminal device may simultaneously complete the measurement on the first TRS and the measurement on the second TRS. This reduces time overheads for the terminal device to complete the TRS measurement in the initial phase of the joint transmission, improves the demodulation performance of the first downlink signal, improves the joint transmission communication quality, and further ensures demodulation performance of the second downlink signal and communication quality between the first network device and the terminal device, thereby improving communication reliability.

It should be noted that an execution sequence of step S601 to step S612 in FIG. 6A and FIG. 6B is merely an example. This is not limited in this embodiment of this application. For example, the second network device may broadcast the first TRS before step S604, or may broadcast the first TRS after step S604 and before step S609. For another example, the second network device may alternatively broadcast the first TRS when the terminal device performs step S604.

In the foregoing embodiment of this application, before determining that the terminal device is to perform joint transmission, the first network device sends the first indication information to the terminal device, to indicate the terminal device to measure the first TRS from the second network device. In the initial phase of the joint transmission performed by the terminal device, the second network device sends the first downlink signal (or second indication information and the first downlink signal) to the terminal device, so that the terminal device demodulates the first downlink signal based on the measurement result of the first TRS. Because the terminal device has completed the measurement on the first TRS before performing joint transmission, the terminal device does not need to measure the first TRS when the terminal device is in the initial phase of the joint transmission, and may directly demodulate the first downlink signal based on a first measurement result. This can reduce time overheads for obtaining the first measurement result by the terminal device in the initial phase of the joint transmission, and avoid a problem that demodulation performance of the first downlink signal is reduced because the terminal device does not compensate for a time offset and a frequency offset in time, thereby improving communication quality.

In the foregoing embodiments provided in this application, the methods provided in embodiments of this application are separately described from perspectives of the first network device, the terminal device, the second network device, and interaction between the first network device, the terminal device, and the second network device. To implement functions in the foregoing methods provided in embodiments of this application, the first network device, the terminal device, and the second network device each may include a hardware structure and/or a software module, and implement the foregoing functions in a form of the hardware structure, the software module, or a combination of the hardware structure and the software module. Whether one of the functions is implemented by using the hardware structure, the software module, or the combination of the hardware structure and the software module depends on a particular application and a design constraint condition of the technical solutions.

Figure 7:
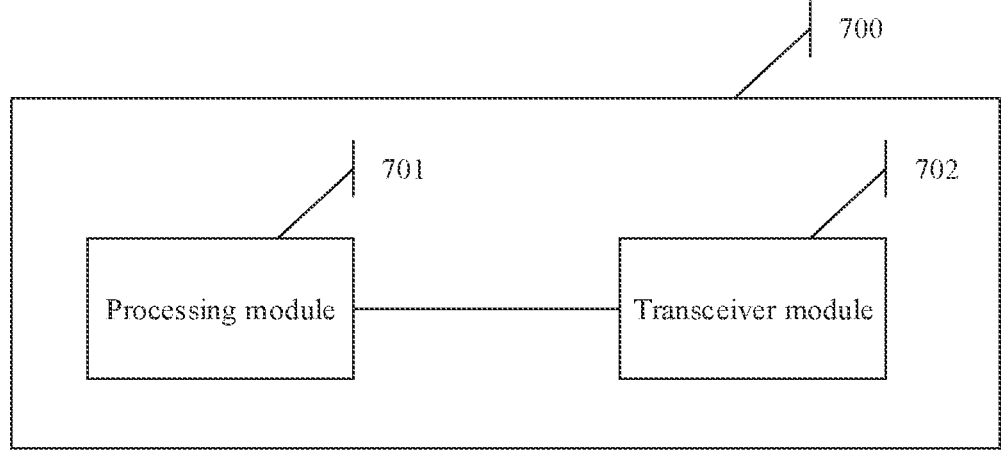
FIG. 7 is a schematic diagram of a structure of a communication apparatus according to an embodiment of this application.

FIG. 7 is a schematic diagram of a structure of a communication apparatus 700. The communication apparatus 700 may be the first network device (or the second network device) in any one of the embodiments shown in FIG. 4 to FIG. 6B, and can implement a function of the first network device (or the second network device) in the method provided in embodiments of this application. Alternatively, the communication apparatus 700 may be an apparatus that can support the first network device (or the second network device) in implementing the function of the first network device (or the second network device) in the method provided in embodiments of this application. The communication apparatus 700 may be a hardware structure, a software module, or a combination of the hardware structure and the software module. The communication apparatus 700 may be implemented by a chip system. In embodiments of this application, the chip system may include a chip, or may include the chip and another discrete component.

The communication apparatus 700 may include a processing module 701 and a transceiver module 702.

In an example, when the communication apparatus 700 is the first network device in any one of the embodiments shown in FIG. 4 to FIG. 6B, the processing module 701 may be configured to perform step S402 in the embodiment shown in FIG. 4; or perform step S502, step S505, step S506, or the like in the embodiment shown in FIG. 5A and FIG. 5B; or perform step S602, step S606, step S607, or the like in the embodiment shown in FIG. 6A and FIG. 6B; or indicate the transceiver module 702 to complete sending and receiving functions; and/or configured to support another process of the technology described in this specification.

The transceiver module 702 may be configured to perform step S403 in the embodiment shown in FIG. 4; or perform step S501, step S503, step S507 to step S509, or the like in the embodiment shown in FIG. 5A and FIG. 5B; or perform step S601, step S603, step S605, step S608, or the like in the embodiment shown in FIG. 6A and FIG. 6B, and/or configured to support another process of the technology described in this specification.

In another example, when the communication apparatus 700 is the second network device in any one of the embodiments shown in FIG. 4 to FIG. 6B, the processing module 701 may be configured to perform step S405 in the embodiment shown in FIG. 4; or perform step S511 in the embodiment shown in FIG. 5A and FIG. 5B; or perform step S610 in the embodiment shown in FIG. 6A and FIG. 6B; or indicate the transceiver module 702 to complete sending and receiving functions; and/or configured to support another process of the technology described in this specification.

The transceiver module 702 may be configured to perform step S401, step S405 to step S407, or the like in the embodiment shown in FIG. 4; or perform step S504, step S507, step S508, step S512 and step S513, or the like in the embodiment shown in FIG. 5A and FIG. 5B; or perform step S604, step S611, step S612, or the like in the embodiment shown in FIG. 6A and FIG. 6B; and/or configured to support another process of the technology described in this specification.

The transceiver module 702 is used by the communication apparatus 700 to communicate with another module. The transceiver module 702 may be a circuit, a component, an interface, a bus, a software module, a transceiver, or any other apparatus that can implement communication.

All related content of the steps in the foregoing method embodiments may be cited in function descriptions of corresponding functional modules. Details are not described herein again.

It should be noted that the processing module may also be referred to as a processing unit, a processor, a processing apparatus, a processing board, or the like; and the transceiver module may also be referred to as a communication module, a transceiver, a transceiver machine, a transceiver unit, a transceiver circuit, or the like. This is not limited in this embodiment of this application.

Module division in this embodiment of this application is an example and is merely logical function division, and may be other division during actual implementation. In addition, functional modules in embodiments of this application may be integrated into one processor or may exist alone physically, or two or more modules may be integrated into one module. The integrated module may be implemented in a form of hardware, or may be implemented in a form of a software functional module.

Figure 8:
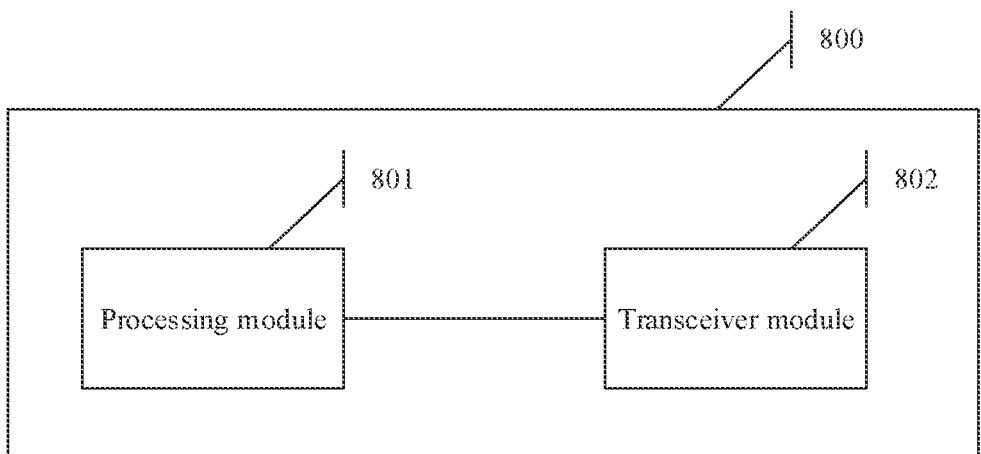
FIG. 8 is a schematic diagram of a structure of another communication apparatus according to an embodiment of this application.

FIG. 8 is a schematic diagram of a structure of a communication apparatus 800. The communication apparatus 800 may be the terminal device in any one of the embodiments shown in FIG. 4 to FIG. 6B, and can implement a function of the terminal device in the method provided in embodiments of this application. The communication apparatus 800 may alternatively be an apparatus that can support the terminal device in implementing the function of the terminal device in the method provided in embodiments of this application. The communication apparatus 800 may be a hardware structure, a software module, or a combination of the hardware structure and the software module. The communication apparatus 800 may be implemented by a chip system. In embodiments of this application, the chip system may include a chip, or may include the chip and another discrete component.

The communication apparatus 800 may include a processing module 801 and a transceiver module 802.

In an example, the processing module 801 may be configured to perform step S404, step S408, or the like in the embodiment shown in FIG. 4; or perform step S510, step S514, or the like in the embodiment shown in FIG. 5A and FIG. 5B; or perform step S609, step S613, or the like in the embodiment shown in FIG. 6A and FIG. 6B; or indicate the transceiver module 802 to complete sending and receiving functions; and/or configured to support another process of the technology described in this specification.

The transceiver module 802 may be configured to perform step S401, step S403, step S406, step S407, or the like in the embodiment shown in FIG. 4; or perform step S501, step S503, step S509, step S512, step S513, or the like in the embodiment shown in FIG. 5A and FIG. 5B; or perform step S601, step S603, step S605, step S608, step S611, or step S612 in the embodiment shown in FIG. 6A and FIG. 6B; or indicate the transceiver module 802 to complete sending and receiving functions; and/or configured to support another process of the technology described in this specification.

The transceiver module 802 is used by the communication apparatus 800 to communicate with another module. The transceiver module 802 may be a circuit, a component, an interface, a bus, a software module, a transceiver, or any other apparatus that can implement communication.

All related content of the steps in the foregoing method embodiments may be cited in function descriptions of corresponding functional modules. Details are not described herein again.

It should be noted that the processing module may also be referred to as a processing unit, a processor, a processing apparatus, a processing board, or the like; and the transceiver module may also be referred to as a communication module, a transceiver, a transceiver machine, a transceiver unit, a transceiver circuit, or the like. This is not limited in this embodiment of this application.

Module division in this embodiment of this application is an example and is merely logical function division, and may be other division during actual implementation. In addition, functional modules in embodiments of this application may be integrated into one processor or may exist alone physically, or two or more modules may be integrated into one module. The integrated module may be implemented in a form of hardware, or may be implemented in a form of a software functional module.

Figure 9:
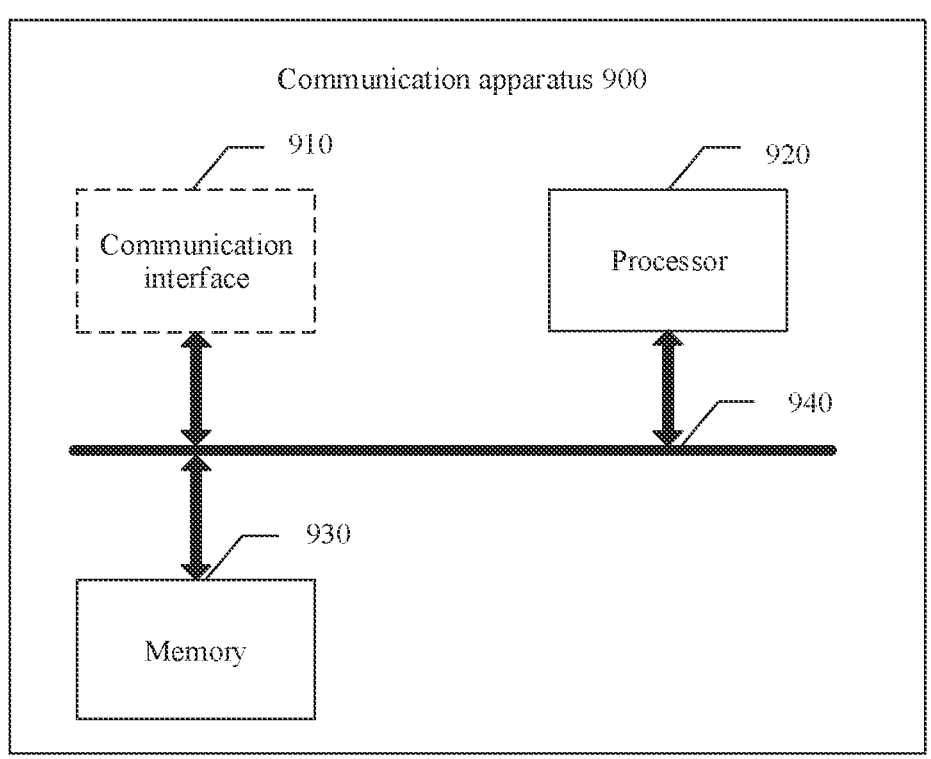
FIG. 9 is a schematic diagram of a structure of another communication apparatus according to an embodiment of this application.

FIG. 9 shows a communication apparatus 900 according to an embodiment of this application. The communication apparatus 900 may be the first network device (or the second network device) in any one of the embodiments shown in FIG. 4 to FIG. 6B, and can implement a function of the first network device (or the second network device) in the method provided in embodiments of this application. Alternatively, the communication apparatus 900 may be an apparatus that can support the first network device (or the second network device) in implementing the function of the first network device (or the second network device) in the method provided in embodiments of this application. The communication apparatus 900 may be a chip system. In this embodiment of this application, the chip system may include a chip, or may include the chip and another discrete component.

In hardware implementation, the communication module 702 may be a transceiver, and the transceiver is integrated into the communication apparatus 900 to form a communication interface 910.

The communication apparatus 900 includes at least one processor 920, configured to implement the function of the second terminal device in the method provided in embodiments of this application or support the communication apparatus 900 in implementing the function of the second terminal device in the method provided in embodiments of this application. For example, the processor 920 may determine whether a terminal device is to enter a first area. For details, refer to the detailed descriptions in the method examples. Details are not described herein again.

The communication apparatus 900 may further include at least one memory 930, configured to store program instructions and/or data. The memory 930 is coupled to the processor 920. The coupling in this embodiment of this application is indirect coupling or a communication connection between apparatuses, units, or modules, may be in an electrical form, a mechanical form, or another form, and is used for information exchange between the apparatuses, the units, or the modules. The processor 920 may operate cooperatively with the memory 930. The processor 920 may execute the program instructions stored in the memory 930. The at least one memory may be included in the processor.

The communication apparatus 900 may further include the communication interface 910, configured to communicate with another device by using a transmission medium, so that an apparatus in the communication apparatus 900 can communicate with the another device. For example, the communication apparatus 900 is a first network device, and the another device may be a second network device or a terminal device; or the communication apparatus 900 is a second network device, and the another device may be a first network device or a terminal device. The processor 920 may send and receive data through the communication interface 910. The communication interface 910 may be specifically a transceiver.

A specific connection medium between the communication interface 910, the processor 920, and the memory 930 is not limited in this embodiment of this application. In this embodiment of this application, in FIG. 9, the memory 930, the processor 920, and the communication interface 910 are connected through a bus 940, and the bus is represented using a bold line in FIG. 9. A connection manner between other components is merely an example for description, and imposes no limitation. The bus may be classified into an address bus, a data bus, a control bus, and the like. For ease of representation, only one thick line is used to represent the bus in FIG. 9, but this does not mean that there is only one bus or only one type of bus.

In this embodiment of this application, the processor 920 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware in the processor and a software module.

In this embodiment of this application, the memory 930 may be a non-volatile memory such as a hard disk drive (HDD) or a solid-state drive (SSD), or may be a volatile memory such as a random access memory (RAM). The memory is any other medium that can carry or store expected program code in a form of an instruction or a data structure and can be accessed by a computer, but is not limited thereto. The memory in embodiments of this application may alternatively be a circuit or any other apparatus that can implement a storage function, and is configured to store the program instructions and/or the data.

Figure 10:
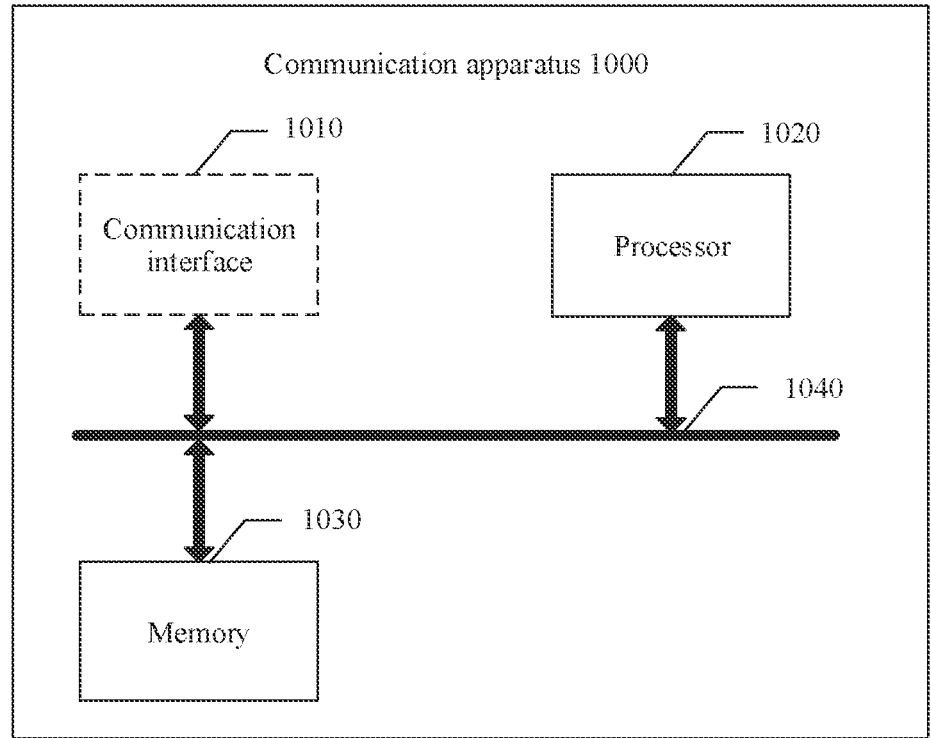
FIG. 10 is a schematic diagram of a structure of another communication apparatus according to an embodiment of this application.

FIG. 10 shows a communication apparatus 1000 according to an embodiment of this application. The communication apparatus 1000 may be the terminal device in any one of the embodiments shown in FIG. 4 to FIG. 6B, and can implement a function of the terminal device in the method provided in embodiments of this application. The communication apparatus 1000 may alternatively be an apparatus that can support the terminal device in implementing the function of the terminal device in the method provided in embodiments of this application. The communication apparatus 1000 may be a chip system. In this embodiment of this application, the chip system may include a chip, or may include the chip and another discrete component.

In hardware implementation, the communication module 802 may be a transceiver, and the transceiver is integrated into the communication apparatus 1000 to form a communication interface 1010.

The communication apparatus 1000 includes at least one processor 1020, configured to implement the function of the network device in the method provided in embodiments of this application or support the communication apparatus 1000 in implementing the function of the network device in the method provided in embodiments of this application. For example, the processor 1020 may measure a first TRS to obtain a first measurement result, and demodulate a first downlink signal based on the first measurement result. For details, refer to the detailed descriptions in the method examples. Details are not described herein again.

The communication apparatus 1000 may further include at least one memory 1030, configured to store program instructions and/or data. The memory 1030 is coupled to the processor 1020. The coupling in this embodiment of this application is indirect coupling or a communication connection between apparatuses, units, or modules, may be in an electrical form, a mechanical form, or another form, and is used for information exchange between the apparatuses, the units, or the modules. The processor 1020 may operate cooperatively with the memory 1030. The processor 1020 may execute the program instructions stored in the memory 1030. The at least one memory may be included in the processor.

The communication apparatus 1000 may further include a communication interface 1010, configured to communicate with another device by using a transmission medium, so that an apparatus in the apparatus 1000 can communicate with the another device. For example, the another device may be a second terminal device. The processor 1020 may send and receive data through the communication interface 1010. The communication interface 1010 may be specifically a transceiver.

A specific connection medium between the communication interface 1010, the processor 1020, and the memory 1030 is not limited in this embodiment of this application. In this embodiment of this application, the memory 1030, the processor 1020, and the communication interface 1010 are connected to each other through a bus 1040 in FIG. 10. The bus is represented by using a thick line in FIG. 10. A connection manner between other components is only an example for descriptions, and is not limited thereto. The bus may be classified into an address bus, a data bus, a control bus, and the like. For ease of representation, only one thick line is used to represent the bus in FIG. 10, but this does not mean that there is only one bus or only one type of bus.

In this embodiment of this application, the processor 1020 may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in embodiments of this application. The general-purpose processor may be a microprocessor, or may be any conventional processor or the like. The steps of the method disclosed with reference to embodiments of this application may be directly performed by a hardware processor, or may be performed by a combination of hardware in the processor and a software module.

In this embodiment of this application, the memory 1030 may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and can be accessed by a computer, but is not limited thereto. The memory in embodiments of this application may alternatively be a circuit or any other apparatus that can implement a storage function, and is configured to store the program instructions and/or the data.

An embodiment of this application further provides a communication apparatus 1100. The communication apparatus 1100 may be a terminal device or a circuit. The communication apparatus 1100 may be configured to perform an action performed by the terminal device in the foregoing method embodiments.

Figure 11:
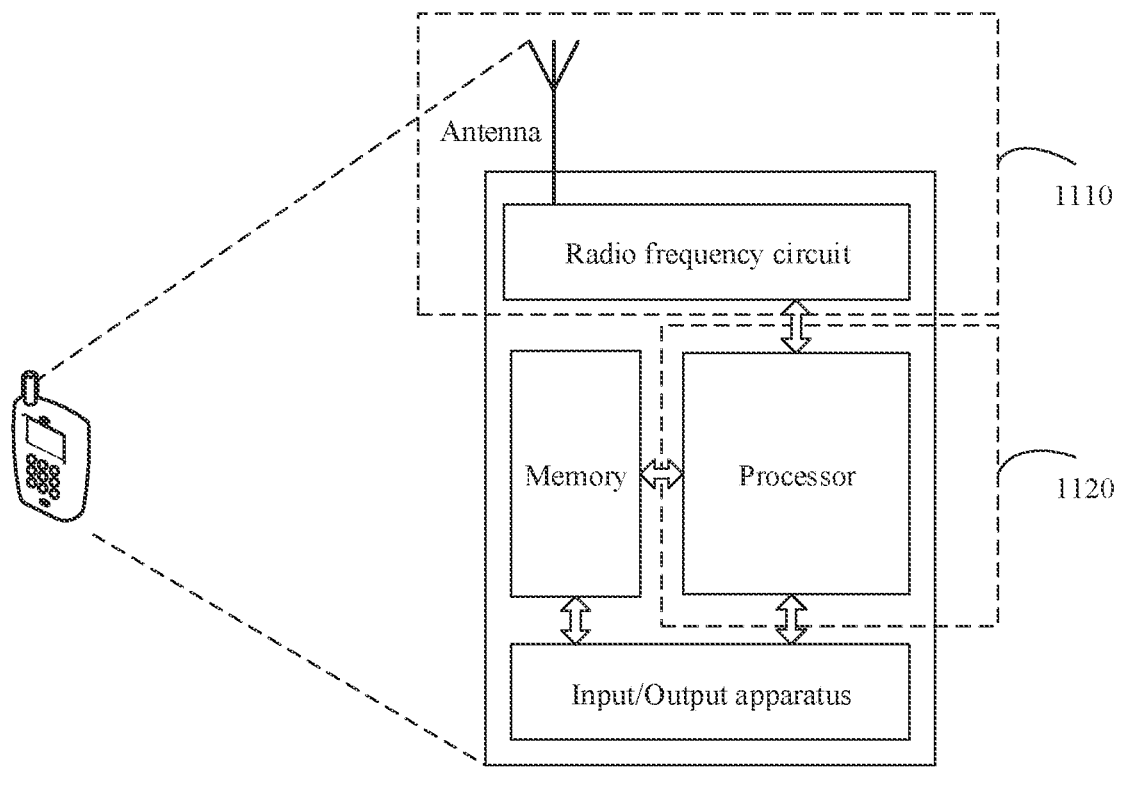
FIG. 11 is a schematic block diagram of a communication apparatus according to an embodiment of this application.

When the communication apparatus is a terminal device, FIG. 11 is a simplified schematic diagram of a structure of the terminal device. For ease of understanding and ease of illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to: perform conversion between a baseband signal and a radio frequency signal, and process the radio frequency signal. The antenna is mainly configured to send and receive radio frequency signals in a form of an electromagnetic wave. The input/output apparatus, such as a touchscreen, a display, or a keyboard, is mainly configured to: receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives a radio frequency signal through the antenna, converts the radio frequency signal into a baseband signal, and outputs the baseband signal to the processor, and the processor converts the baseband signal into data and processes the data. For ease of description, FIG. 11 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, the antenna and the radio frequency circuit that have sending and receiving functions may be considered as a transceiver unit of the terminal device, and the processor that has a processing function may be considered as a processing unit of the terminal device. As shown in FIG. 11, the terminal device includes a transceiver unit 1110 and a processing unit 1120. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1110 and that is configured to implement a receiving function may be considered as a receiving unit, and a component that is in the transceiver unit 1110 and that is configured to implement a sending function may be considered as a sending unit. That is, the transceiver unit 1110 includes the receiving unit and the sending unit. The transceiver unit sometimes may also be referred to as a transceiver machine, a transceiver, a transceiver circuit, or the like.

It should be understood that the transceiver unit 1110 is configured to perform a sending operation and a receiving operation on the terminal device side in the foregoing method embodiments, and the processing unit 1120 is configured to perform an operation other than the sending operation and the receiving operation of the terminal device in the foregoing method embodiments.

For example, in an implementation, the transceiver unit 1110 is configured to perform step S401, step S403, step S406, or step S407 in the embodiment shown in FIG. 4, and/or the transceiver unit 1110 is further configured to perform other receiving and sending steps on the terminal device side in embodiments of this application. The processing unit 1120 is configured to perform step S404 and step S408 in the embodiment shown in FIG. 4; and/or the processing unit 1120 is further configured to perform another processing step on the terminal device side in embodiments of this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 12:
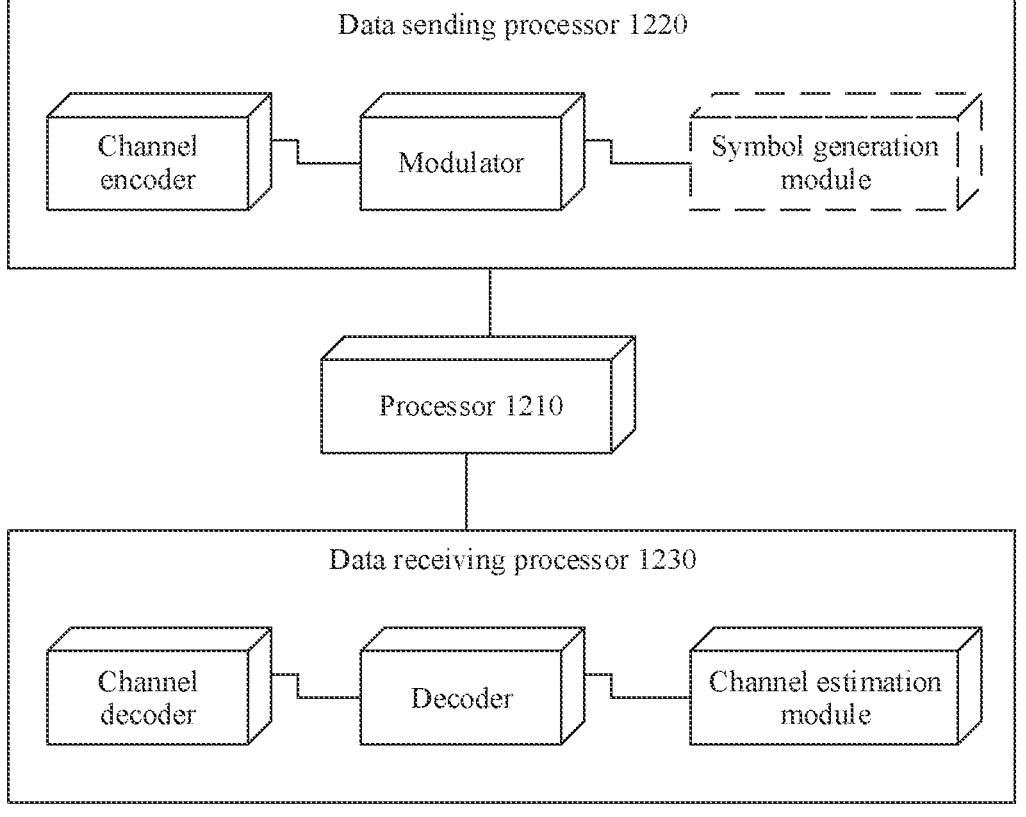
FIG. 12 is another schematic block diagram of a communication apparatus according to an embodiment of this application.

When the communication apparatus in this embodiment is the terminal device, refer to a device shown in FIG. 12. In an example, the device may implement a function similar to that of the processor 1020 in FIG. 10. In FIG. 12, the device includes a processor 1210, a data sending processor 1220, and a data receiving processor 1230. The processing module 801 in the foregoing embodiment may be the processor 1210 in FIG. 12, and implements a corresponding function. The transceiver module 802 in the foregoing embodiment may be the data sending processor 1220 and/or the data receiving processor 1230 in FIG. 12. Although FIG. 12 shows a channel encoder and a channel decoder, it may be understood that the modules are merely examples, and do not constitute a limitation on this embodiment.

Figure 13:
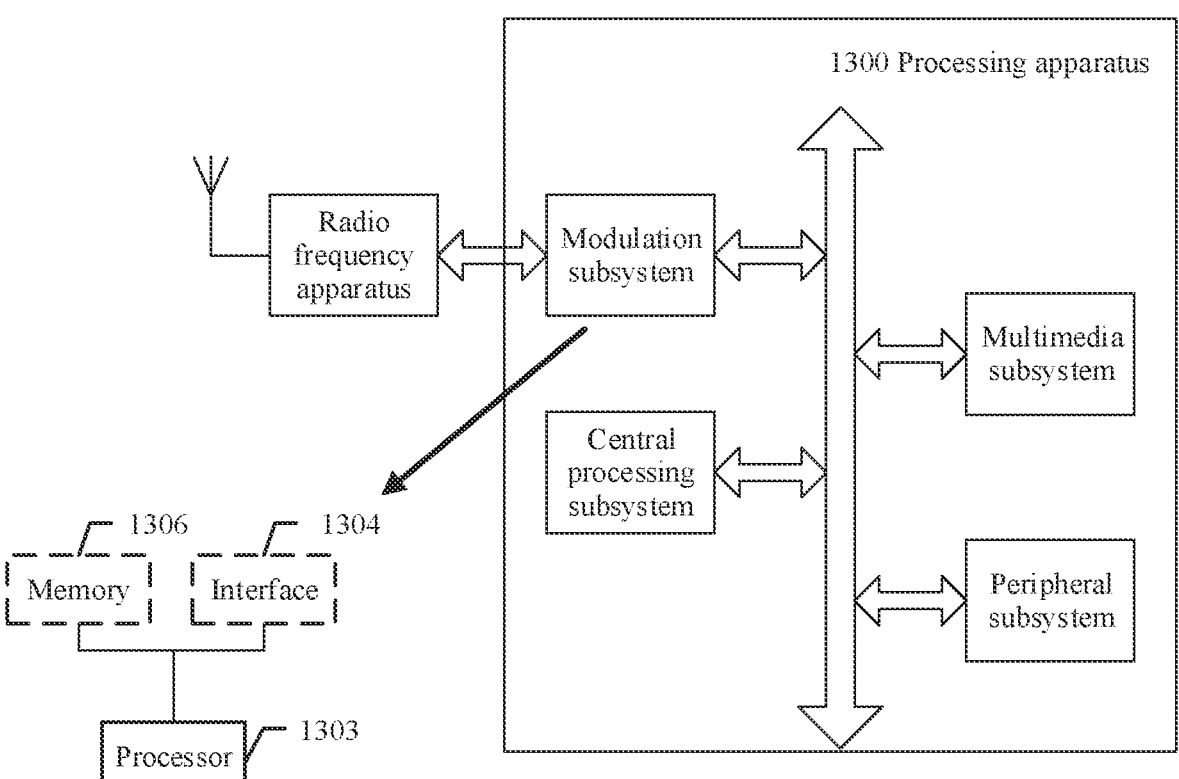
FIG. 13 is still another schematic block diagram of a communication apparatus according to an embodiment of this application.

FIG. 13 shows another form of this embodiment. A processing apparatus 1300 includes modules such as a modulation subsystem, a central processing subsystem, and a peripheral subsystem. The communication apparatus in this embodiment may be used as the modulation subsystem. Specifically, the modulation subsystem may include a processor 1303 and an interface 1304. The processor 1303 implements a function of the processing module 801, and the interface 1304 implements a function of the transceiver module 802. In another variation, the modulation subsystem includes a memory 1306, a processor 1303, and a program that is stored in the memory 1306 and that can be run on the processor. When executing the program, the processor 1303 implements the method on the terminal device side in the foregoing method embodiments. It should be noted that the memory 1306 may be a non-volatile memory or a volatile memory. The memory 1306 may be located in the modulation subsystem, or may be located in the processing apparatus 1300, provided that the memory 1306 can be connected to the processor 1303.

In another form of this embodiment, a computer-readable storage medium is provided. The computer-readable storage medium stores instructions. When the instructions are executed, the method on the terminal device side in the foregoing method embodiments is performed.

In another form of this embodiment, a computer program product including instructions is provided. When the instructions are executed, the method on the terminal device side in the foregoing method embodiments is performed.

Figure 14:
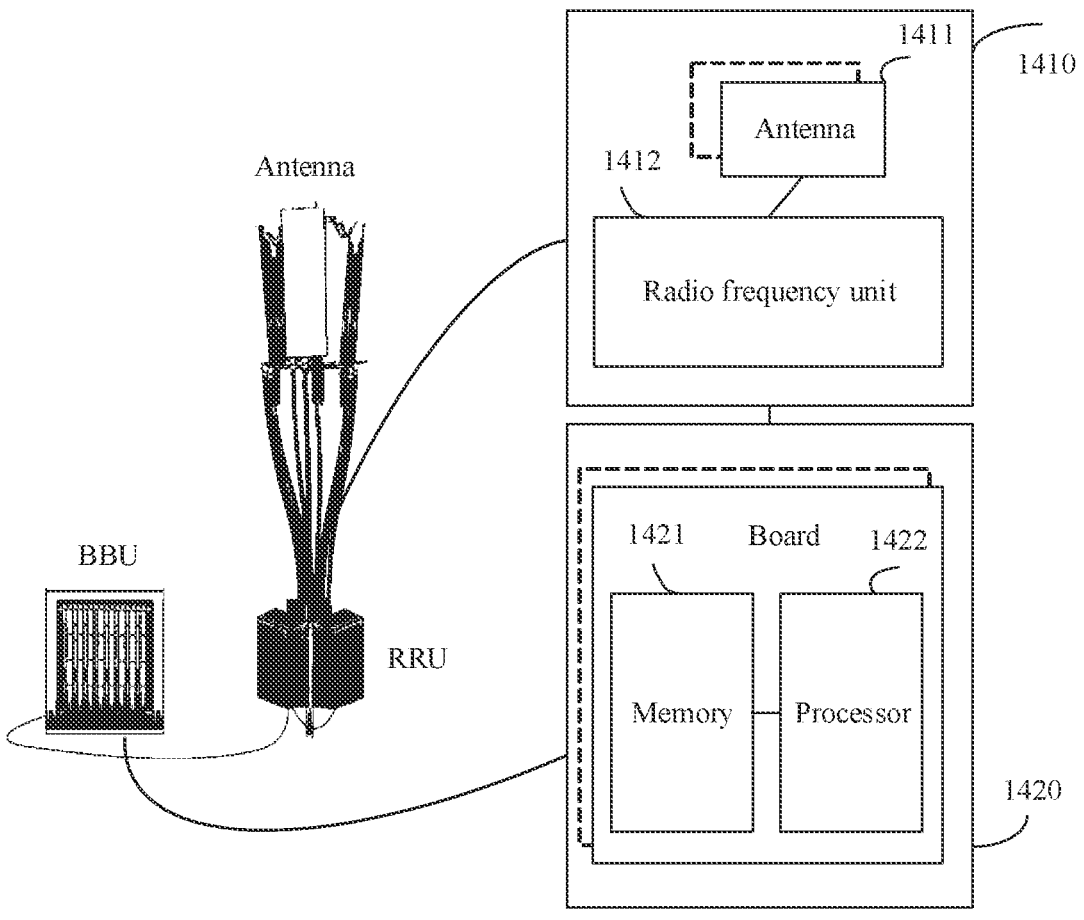
FIG. 14 is yet another schematic block diagram of a communication apparatus according to an embodiment of this application.

When the apparatus in this embodiment is a network device, the network device may be shown in FIG. 14. The apparatus 1400 includes one or more radio frequency units, for example, a remote radio unit (RRU) 1410 and one or more baseband units (BBUs) (which may also be referred to as digital units, digital units, DUs) 1420. The RRU 1410 may be referred to as a transceiver module, and corresponds to the transceiver module 702 in FIG. 7. Optionally, the transceiver module may also be referred to as a transceiver, a transceiver circuit, a transceiver, or the like. The transceiver module may include at least one antenna 1411 and a radio frequency unit 1412. The RRU 1410 is mainly configured to: receive and send a radio frequency signal, and perform conversion between the radio frequency signal and a baseband signal, for example, send indication information to a terminal device. The BBU 1410 is mainly configured to perform baseband processing, control a base station, and the like. The RRU 1410 and the BBU 1420 may be physically disposed together, or may be physically disposed separately, that is, in a distributed base station.

The BBU 1420 is a control center of the base station, or may be referred to as a processing module. The BBU 1420 may correspond to a processing module 601 in FIG. 6A and FIG. 6B, and is mainly configured to implement a baseband processing function, for example, channel coding, multiplexing, modulation, or frequency spreading. For example, the BBU (the processing module) may be configured to control the base station to perform the operation procedure related to the network device in the foregoing method embodiments, for example, generate the foregoing indication information.

In an example, the BBU 1420 may include one or more boards, and a plurality of boards may jointly support a radio access network (such as an LTE network) of a single access standard, or may separately support radio access networks (such as an LTE network, a 5G network, or another network) of different access standards. The BBU 1420 further includes a memory 1421 and a processor 1422. The memory 1421 is configured to store necessary instructions and data. The processor 1422 is configured to control the base station to perform a necessary action, for example, configured to control the base station to perform an operation procedure related to the network device in the foregoing method embodiments. The memory 1421 and the processor 1422 may serve the one or more boards. In other words, a memory and a processor may be disposed on each board. Alternatively, a plurality of boards may share a same memory and a same processor. In addition, a necessary circuit may further be disposed on each board.

An embodiment of this application further provides a computer-readable storage medium, including instructions. When the instructions are run on a computer, the computer is enabled to perform the method performed by the first network device or the second network device in the foregoing embodiments.

An embodiment of this application further provides a computer-readable storage medium, including instructions. When the instructions are run on a computer, the computer is enabled to perform the method performed by the terminal device in the foregoing embodiments.

An embodiment of this application further provides a computer program product, including instructions. When the instructions are run on a computer, the computer is enabled to perform the method performed by the first network device or the second network device in the foregoing embodiments.

An embodiment of this application further provides a computer program product, including instructions. When the instructions are run on a computer, the computer is enabled to perform the method performed by the terminal device in the foregoing embodiments.

An embodiment of this application provides a chip system. The chip system includes a processor, and may further include a memory, to implement a function of the terminal device in the foregoing methods. The chip system may include a chip, or may include the chip and another discrete component.

An embodiment of this application provides a chip system. The chip system includes a processor, and may further include a memory, to implement a function of the first network device in the foregoing methods. The chip system may include a chip, or may include the chip and another discrete component.

An embodiment of this application provides a chip system. The chip system includes a processor, and may further include a memory, to implement a function of the second network device in the foregoing methods. The chip system may include a chip, or may include the chip and another discrete component.

An embodiment of this application provides a communication system. The communication system includes the foregoing first network device, and/or the terminal device, and/or the second network device.

The methods provided in embodiments of this application may be completely or partially implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL for short)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

It is clearly that, a person skilled in the art can make various modifications and variations to this application without departing from the scope of this application. This application is intended to cover these modifications and variations provided that they fall within the scope of the claims of this application and their equivalent technologies.

What is claimed is:

1. A communication method, comprising:
determining, by a first network device, that a terminal device is to enter a first area, wherein the first area is an area in which the terminal device is handed over from the first network device to a second network device, or the first area is an area in which the first network device and the second network device perform joint transmission; and
in response to determining that the terminal device is to enter the first area in which the terminal device is handed over or in which the first network device and the second network device perform joint transmission, sending, by the first network device, first indication information to the terminal device before the terminal device enters the first area, wherein the first indication information indicates to measure a first tracking reference signal of the second network device, and wherein the method further comprises:
receiving, by the first network device, first information from the terminal device, wherein the first information indicates a first quantity and a second quantity, the first quantity is a quantity of simultaneously activated transmission configuration indicator-states supported by the terminal device, the second quantity is a quantity of simultaneously measured tracking reference signals supported by the terminal device, and each of the simultaneously activated transmission configuration indicator-states indicates a correspondence between a tracking reference signal and a service; and
when the first quantity is greater than or equal to 2 and the second quantity is greater than or equal to 2, determining, by the first network device, that the terminal device has a capability of compensating for a time offset and a frequency offset based on a measurement result of the first tracking reference signal and a measurement result of a second tracking reference signal, wherein the second tracking reference signal is a tracking reference signal of the first network device.

2. The method according to claim 1, wherein the determining, by a first network device, that a terminal device is to enter a first area comprises:
receiving, by the first network device, information about first reference signal received quality from the terminal device; and
when a difference between the first reference signal received quality and reference signal received quality of the terminal device in one or more neighboring cells is less than or equal to a first threshold, determining, by the first network device, that the terminal device is to enter the first area.

3. The method according to claim 1, wherein the determining, by a first network device, that a terminal device is to enter a first area comprises:
determining, by the first network device based on a movement direction of the terminal device and topology information of a network in which the first network device is located, that the terminal device is to enter the first area.

4. The method according to claim 1, wherein the method further comprises:
receiving, by the first network device, third indication information from the terminal device, wherein the third indication information indicates that the terminal device has a capability of compensating for a time offset and a frequency offset based on a measurement result of the first tracking reference signal and a measurement result of a second tracking reference signal, and the second tracking reference signal is a tracking reference signal of the first network device.

5. The method according to claim 1, wherein compensating for the time offset and the frequency offset based on the measurement result of the first tracking reference signal and the measurement result of the second tracking reference signal comprises: increasing filtering coefficients of a crystal oscillator for the time offset and the frequency offset based on the measurement result of the first tracking reference signal.

6. The method according to claim 1, wherein the first indication information comprises at least one of an identifier of the first tracking reference signal or information about a time-frequency resource that carries the first tracking reference signal.

7. The method according to claim 6, wherein before the terminal device enters the first area, the method further comprises:

receiving, by the first network device, a first message from the second network device, wherein the first message comprises the first indication information.

8. The method according to claim 7, wherein before the receiving a first message from the second network device, the method further comprises:

sending, by the first network device, a second message to the second network device, wherein the second message requests the first indication information.

9. A communication method, comprising:

receiving, by a terminal device, first indication information from a first network device before the terminal device enters a first area, wherein the first indication information indicates to measure a first tracking reference signal of a second network device; and the first area is an area in which the terminal device is handed over from the first network device to the second network device, or the first area is an area in which the first network device and the second network device perform joint transmission, wherein the first indication information is sent in response to a determination that the terminal device is to enter the first area in which the terminal device is handed over or in which the first network device and the second network device perform joint transmission;

measuring, by the terminal device, the first tracking reference signal to obtain a first measurement result;

after the terminal device enters the first area, receiving, by the terminal device, a first downlink signal from the second network device; and demodulating, by the terminal device, the first downlink signal based on the first measurement result, and wherein the method further comprises:

sending, by the terminal device, first information to the first network device, wherein the first information indicates a first quantity and a second quantity, the first information is used to determine that the terminal device has a capability of compensating for a time offset and a frequency offset based on the first measurement result and a measurement result of a second tracking reference signal, the first quantity is a quantity of simultaneously activated transmission configuration indicator-states supported by the terminal device, the second quantity is a quantity of simultaneously measured tracking reference signals supported by the terminal device, each of the simultaneously activated indicates a correspondence between a tracking reference signal and a service, and the second tracking reference signal is a tracking reference signal of the first network device.

10. The method according to claim 9, wherein after the terminal device enters the first area, the method further comprises:

receiving, by the terminal device, second indication information from the second network device, wherein the second indication information indicates to demodulate the first downlink signal based on the first measurement result.

11. The method according to claim 9, wherein the method further comprises:

sending, by the terminal device, information about first reference signal received quality to the first network device, wherein the information about the first reference signal received quality is used to determine that the terminal device is to enter the first area.

12. The method according to claim 9, wherein the method further comprises:

sending, by the terminal device, third indication information to the first network device, wherein the third indication information indicates that the terminal device has a capability of compensating for a time offset and a frequency offset based on the first measurement result and a measurement result of a second tracking reference signal, and the second tracking reference signal is a tracking reference signal of the first network device.

13. The method according to claim 9, wherein compensating for the time offset and the frequency offset based on the first measurement result and the measurement result of the second tracking reference signal comprises: increasing filtering coefficients of a crystal oscillator for the time offset and the frequency offset based on the first measurement result.

14. The method according to claim 9, wherein the first indication information comprises at least one of an identifier of the first tracking reference signal or information about a time-frequency resource that carries the first tracking reference signal.

15. A terminal device, comprising:

at least one processor; and one or more memories coupled to the at least one processor and storing programming instructions for execution by the at least one processor to cause the terminal device to perform operations comprising:

receiving, by the terminal device, first indication information from a first network device before the terminal device enters a first area, wherein the first indication information indicates to measure a first tracking reference signal of a second network device; and the first area is an area in which the terminal device is handed over from the first network device to the second network device, or the first area is an area in which the first network device and the second network device perform joint transmission, wherein the first indication information is sent in response to a determination that the terminal device is to enter the first area in which the terminal device is handed over or in which the first network device and the second network device perform joint transmission;

measuring, by the terminal device, the first tracking reference signal to obtain a first measurement result;

after the terminal device enters the first area, receiving, by the terminal device, a first downlink signal from the second network device; and demodulating, by the terminal device, the first downlink signal based on the first measurement result; and wherein the operations further comprise:

sending, by the terminal device, first information to the first network device, wherein the first information indicates a first quantity and a second quantity, the first information is used to determine that the terminal device has a capability of compensating for a time offset and a frequency offset based on the first measurement result and a measurement result of a second tracking reference signal, the first quantity is a quantity of simultaneously activated transmission configuration indicator-states supported by the terminal device, the second quantity is a quantity of simultaneously measured tracking reference signals supported by the terminal device, each of the simultaneously activated indicates a correspondence between a tracking reference signal and a service, and the second tracking reference signal is a tracking reference signal of the first network device.

16. The terminal device according to claim 15, wherein the operations further comprise:

after the terminal device enters the first area, receiving, by the terminal device, second indication information from the second network device, wherein the second indication information indicates to demodulate the first downlink signal based on the first measurement result.

17. The terminal device according to claim 15, wherein the operations further comprise:

sending, by the terminal device, information about first reference signal received quality to the first network device, wherein the information about the first reference signal received quality is used to determine that the terminal device is to enter the first area.

18. The terminal device according to claim 15, wherein the operations further comprise:

sending, by the terminal device, third indication information to the first network device, wherein the third indication information indicates that the terminal device has a capability of compensating for a time offset and a frequency offset based on the first measurement result and a measurement result of a second tracking reference signal, and the second tracking reference signal is a tracking reference signal of the first network device.

19. The terminal device according to claim 15, wherein the compensating for the time offset and the frequency offset based on the first measurement result and the measurement result of the second tracking reference signal comprises: increasing filtering coefficients of a crystal oscillator for the time offset and the frequency offset based on the first measurement result.

20. The terminal device according to claim 15, wherein the first indication information comprises at least one of an identifier of the first tracking reference signal or information about a time-frequency resource that carries the first tracking reference signal.

* * * * *